(12) United States Patent
Kang et al.

(10) Patent No.: US 12,443,223 B2
(45) Date of Patent: Oct. 14, 2025

(54) FLEXIBLE DISPLAY AND ELECTRONIC DEVICE INCLUDING SAME

(71) Applicant: Samsung Electronics Co., Ltd., Suwon-si (KR)

(72) Inventors: Jooyoung Kang, Suwon-si (KR); Myunghoon Kwak, Suwon-si (KR); Moonchul Shin, Suwon-si (KR); Junghyeob Lee, Suwon-si (KR); Hojin Jung, Suwon-si (KR); Hyunju Hong, Suwon-si (KR); Yangwook Kim, Suwon-si (KR); Jookwan Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 392 days.

(21) Appl. No.: 18/146,751

(22) Filed: Dec. 27, 2022

(65) Prior Publication Data

US 2023/0213967 A1     Jul. 6, 2023

Related U.S. Application Data

(63) Continuation of application No. PCT/KR2022/020355, filed on Dec. 14, 2022.

(30) Foreign Application Priority Data

Dec. 30, 2021   (KR) .................. 10-2021-0192808
Mar. 15, 2022   (KR) .................. 10-2022-0031879

(51) Int. Cl.
 *G06F 1/16*     (2006.01)
(52) U.S. Cl.
 CPC .......... *G06F 1/1624* (2013.01); *G06F 1/1635* (2013.01); *G06F 1/1652* (2013.01); *G06F 1/1675* (2013.01)

(58) Field of Classification Search
 CPC .... G06F 1/1624; G06F 1/1635; G06F 1/1652; G06F 1/1675; G06F 1/16; G09F 9/30
 (Continued)

(56) References Cited

U.S. PATENT DOCUMENTS 11,012,546 B1      5/2021   Song et al.
11,543,859 B2 *    1/2023   Kwak ................. H04M 1/0237
(Continued)

FOREIGN PATENT DOCUMENTS

KR   10-2017-0116551 A     10/2017
KR   10-2018-0098644 A     9/2018
(Continued)

OTHER PUBLICATIONS

European Examination Report dated Dec. 12, 2024, issued in European Application No. 22916552.7.
(Continued)

*Primary Examiner* — Mahendra R Patel
(74) *Attorney, Agent, or Firm* — Jefferson IP Law, LLP

(57) ABSTRACT

An electronic device is provided. The electronic device includes a first housing, a second housing, the first housing slidable with respect to the second housing, a flexible display including a first display area and a second display area extending from the first display area and bendable or rollable, a battery disposed in the first housing or the second housing, and a supporting structure supporting at least a portion of the flexible display. The supporting structure includes a first area overlapping the battery and a second area extending from the first area. The first area of the supporting structure has a first thickness, and the second area of the supporting structure has a second thickness larger than the first thickness.

19 Claims, 25 Drawing Sheets

(58) Field of Classification Search
USPC .................................................... 455/575.4
See application file for complete search history.

(56) References Cited

U.S. PATENT DOCUMENTS

| | | | |
|---|---|---|---|
| 11,860,694 B2 * | 1/2024 | Shin | ............... G06F 1/1637 |
| 11,994,910 B2 * | 5/2024 | Cho | ............... G06F 1/1652 |
| 2019/0033912 A1 | 1/2019 | Wu et al. | |
| 2019/0261519 A1 * | 8/2019 | Park | ............... G06F 1/1652 |
| 2019/0268455 A1 | 8/2019 | Baek et al. | |
| 2019/0317550 A1 | 10/2019 | Kim et al. | |
| 2020/0170128 A1 * | 5/2020 | Kim | ............... G06F 1/1679 |
| 2020/0304613 A1 | 9/2020 | Cha et al. | |
| 2020/0371564 A1 * | 11/2020 | Kim | ............... H04M 1/0268 |
| 2021/0385315 A1 | 12/2021 | Cha et al. | |
| 2022/0100236 A1 * | 3/2022 | Kwak | ............... H04M 1/0237 |
| 2022/0113765 A1 * | 4/2022 | Kang | ............... G06F 1/16 |
| 2022/0117100 A1 * | 4/2022 | Yoon | ............... G06F 1/1652 |
| 2022/0147179 A1 * | 5/2022 | Kim | ............... G06F 3/041 |
| 2022/0148473 A1 * | 5/2022 | Kim | ............... G06F 1/1652 |
| 2022/0148476 A1 * | 5/2022 | Min | ............... G06F 1/1652 |
| 2022/0357775 A1 | 11/2022 | Choi et al. | |

FOREIGN PATENT DOCUMENTS

| | | | | |
|---|---|---|---|---|
| KR | 10-2019-0119719 A | 10/2019 | | |
| KR | 10-2020-0111083 A | 9/2020 | | |
| KR | 10-2021-0014801 A | 2/2021 | | |
| KR | 10-2021-0080309 A | 6/2021 | | |
| KR | 10-2021-0082742 A | 7/2021 | | |
| KR | 10-2021-0090928 A | 7/2021 | | |
| KR | 10-2274481 B1 | 7/2021 | | |
| KR | 10-2290231 B1 | 8/2021 | | |
| KR | 10-2021-0116380 A | 9/2021 | | |
| KR | 10-2331362 B1 | 11/2021 | | |
| KR | 10-2021-0154719 A | 12/2021 | | |
| WO | 2021/246561 A1 | 9/2021 | | |
| WO | WO-2022060096 A1 * | 3/2022 | | |
| WO | WO-2022097901 A1 * | 5/2022 | ........... G06F 1/1624 |
| WO | WO-2022098090 A1 * | 5/2022 | ........... G06F 1/1624 |
| WO | WO-2022108336 A1 * | 5/2022 | | |
| WO | WO-2022108342 A1 * | 5/2022 | | |
| WO | WO-2022119351 A1 * | 6/2022 | | |
| WO | WO-2022139504 A1 * | 6/2022 | ........... G06F 1/1624 |
| WO | WO-2022169084 A1 * | 8/2022 | ........... G06F 1/1652 |

OTHER PUBLICATIONS

International Search Report and written opinion dated Mar. 13, 2023, issued in International Application No. PCT/KR2022/020355.

Indian Office Action dated Aug. 7, 2025, issued in Indian Patent Application No. 202447052107.

* cited by examiner

FLEXIBLE DISPLAY AND ELECTRONIC DEVICE INCLUDING SAME

CROSS-REFERENCE TO RELATED APPLICATION(S)

This application is a continuation application, claiming priority under § 365(c), of an International application No. PCT/KR2022/020355, filed on Dec. 14, 2022, which is based on and claims the benefit of a Korean patent application number 10-2021-0192808, filed on Dec. 30, 2021, in the Korean Intellectual Property Office, and of a Korean patent application number 10-2022-0031879, filed on Mar. 15, 2022, in the Korean Intellectual Property Office, the disclosure of each of which is incorporated by reference herein in its entirety.

TECHNICAL FIELD

The disclosure relates to a flexible display and an electronic device including the same.

BACKGROUND ART

Developing electronic information communication technology integrates various functionalities into a single electronic device or portable communication device. For example, smartphones pack the functionalities of a sound player, imaging device, and scheduler, as well as the communication functionality and, on top of that, may implement more various functions by having applications installed thereon.

As smartphones or other personal/portable communication devices spread, users' demand for portability and use convenience is on the rise. For example, a touchscreen display may not only serve as an output device of visual information but also provide a virtual keyboard that replaces a mechanical input device (e.g., a button input device). As such, portable communication devices or electronic devices may be made compact while delivering further enhanced applicability (e.g., a larger screen). Flexible displays, e.g., foldable or rollable displays, will come in commerce and electronic devices are expected to deliver better portability and use convenience.

The above information is presented as background information only to assist with an understanding of the disclosure. No determination has been made, and no assertion is made, as to whether any of the above might be applicable as prior art with regard to the disclosure.

DISCLOSURE

Technical Problem

In an electronic device including a flexible display extendable by sliding, a plurality of structures may move (e.g., slide, rotate, or pivot) relative to each other. In this case, some structure (e.g., a first housing and a partial area of the flexible display) may move into or away from another structure (e.g., a second housing).

The mounting space of the electronic device may be limited by newly required driving structures, such as the space where the display is rolled, the structure supporting the display, the driver for slide-in and slide-out motion, and/or the gap between mechanisms for driving.

Aspects of the disclosure are to address at least the above-mentioned problems and/or disadvantages and to provide at least the advantages described below. Accordingly, an aspect of the disclosure is to provide enhance the mounting efficiency by increasing the volume of the internal components disposed to overlap the supporting structure by processing the structure for supporting the display.

Additional aspects will be set forth in part in the description which follows and, in part, will be apparent from the description, or may be learned by practice of the presented embodiments.

Technical Solution

According to an embodiment of the disclosure, an electronic device is provided. The electronic device includes a first housing, a second housing, the first housing being slidable with respect to the second housing, a flexible display including a first display area and a second display area extending from the first display area, the second display area being flexible in at least one direction, a battery disposed in the first housing or the second housing, and a supporting structure supporting at least a portion of the flexible display. The supporting structure includes a first area overlapping the battery and a second area extending from the first area. The first area of the supporting structure has a first thickness, and the second area of the supporting structure has a second thickness larger than the first thickness.

According to an embodiment of the disclosure, an electronic device is provided. The electronic device includes a first housing, a second housing receiving at least a portion of the first housing, the first housing being slidable with respect to the second housing, a flexible display including a first display area and a second display area extending from the first display area, the second display area being bendable or rollable, a supporting structure supporting at least a portion of the flexible display, and a rib structure including a fixing portion coupled with a portion of the supporting structure and a stepped portion extending from the fixing portion and coupled to the first housing.

Advantageous Effects

According to an embodiment, there may be provided an electronic device that allows for stable relative movements of structures and a slide-in/out of the flexible display.

According to an embodiment, in the electronic device, it is possible to enhance the performance of the internal components by forming a recess shape in the supporting structure for the flexible display and increasing the volume of the internal components (e.g., battery and camera module) up to a partial area of the recess shape.

According to an embodiment, in the electronic device, a rib structure may be disposed in the supporting structure for the display. The supporting structure may be disposed to be adhered to the display, and the rib structure slides in a state inserted in the first housing, preventing a lift when the display is bent (or rolled).

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
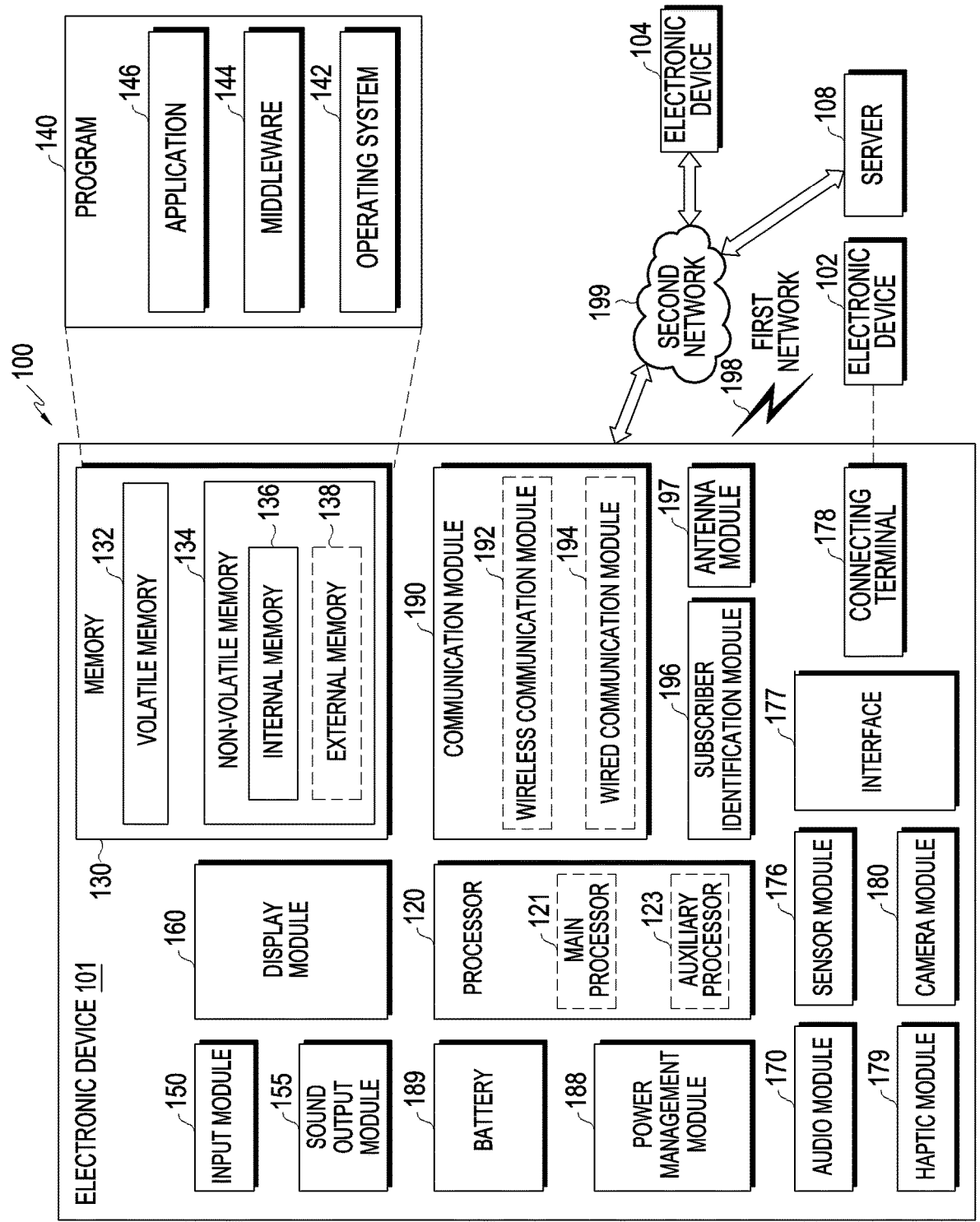
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory 134 may include one or more of an internal memory 136 or an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, Wi-Fi direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
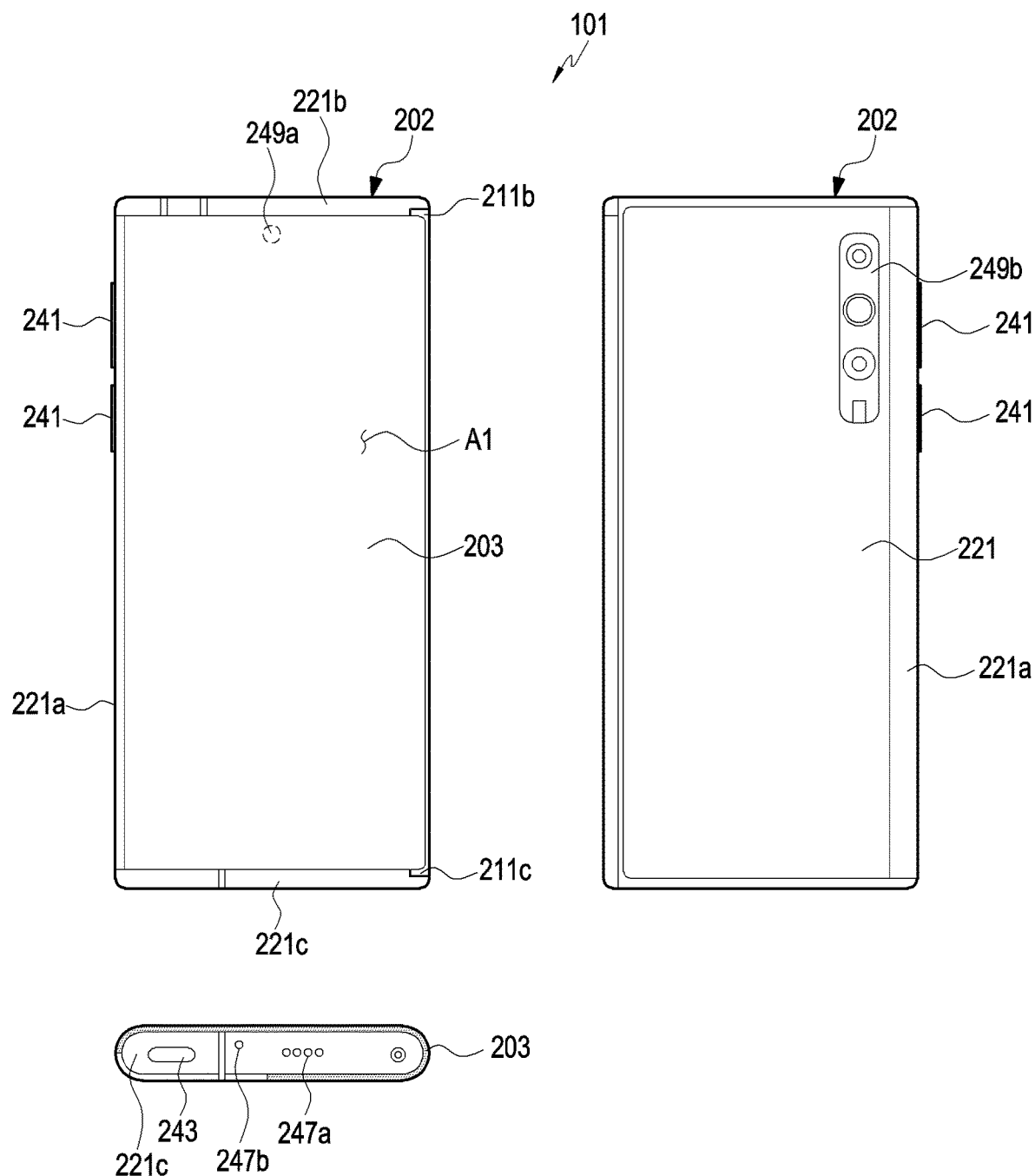
FIG. 2 is a view illustrating a state in which a second display area of a flexible display is received in a second housing, according to an embodiment of the disclosure.

FIG. 2 is a view illustrating a state in which a second display area of a display is received in a second housing, according to an embodiment of the disclosure.

Figure 3:
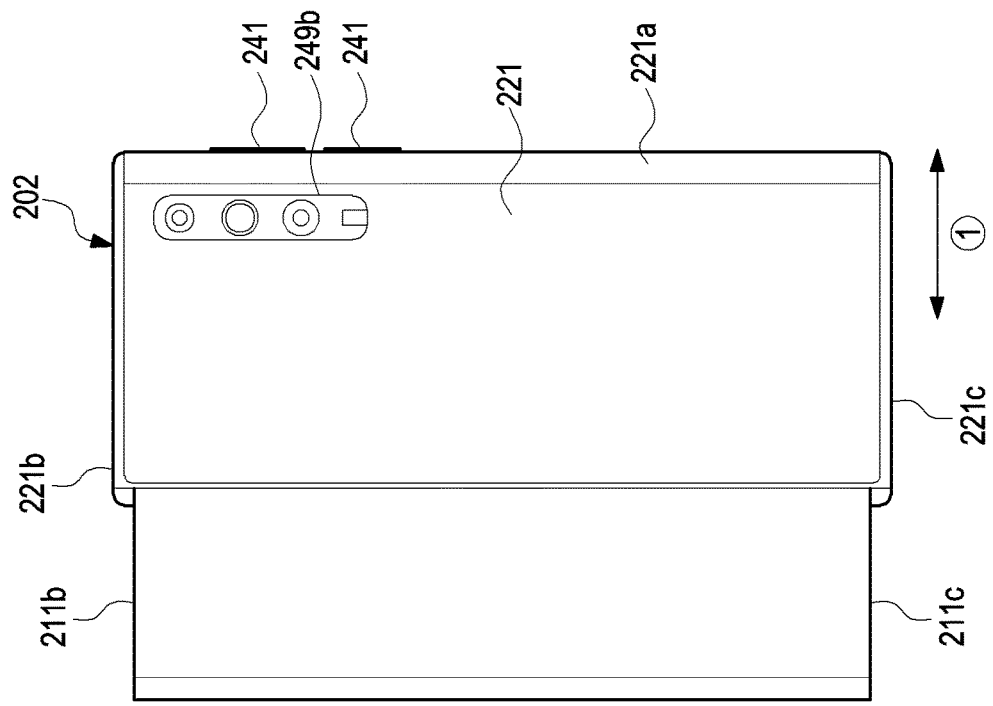
FIG. 3 is a view illustrating a state in which a second display area of a flexible display is exposed to the outside of a second housing, according to an embodiment of the disclosure.
Figure 3:
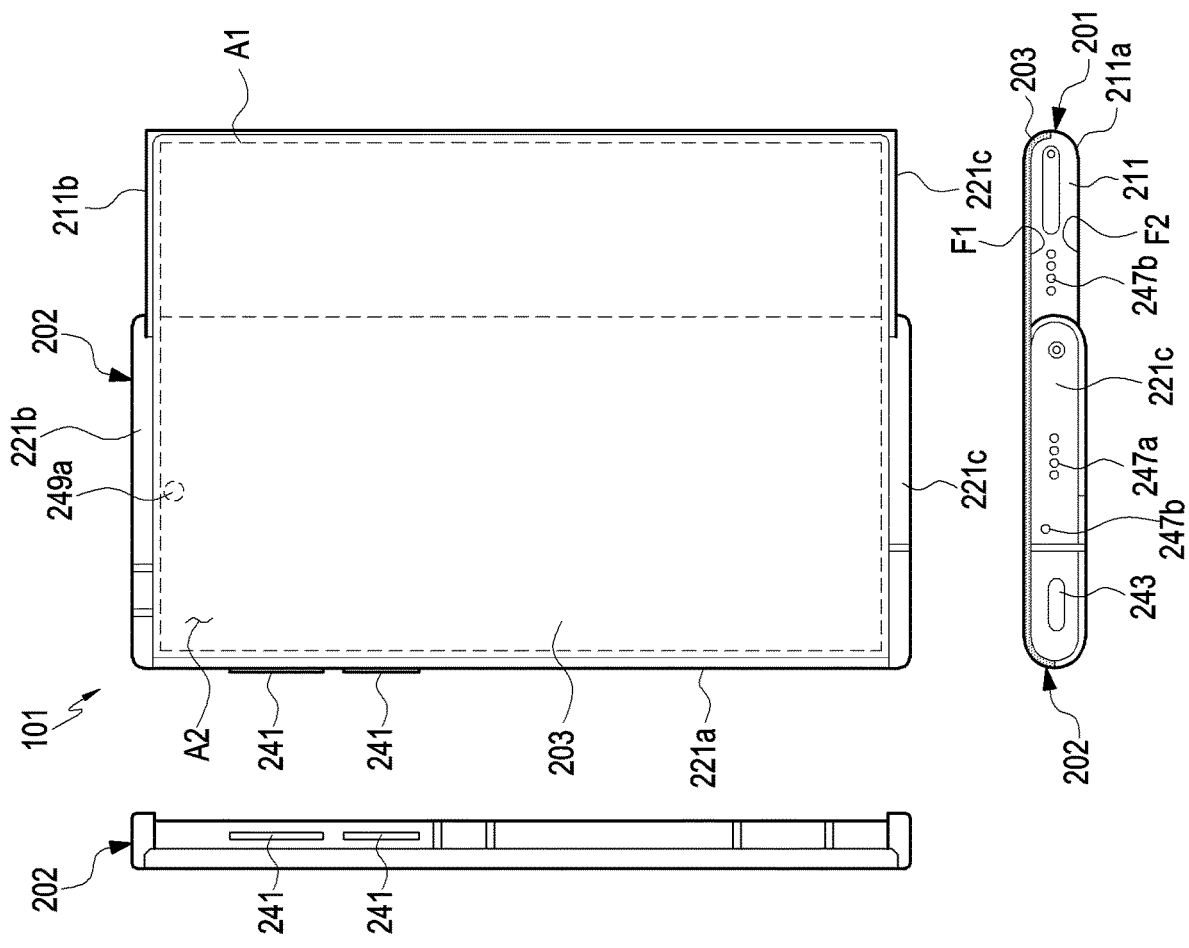

FIG. 3 is a view illustrating a state in which a second display area of a display is exposed to the outside of a second housing, according to an embodiment of the disclosure.

FIGS. 2 and 3 illustrate a structure in which the display 203 (e.g., flexible display) is extended to the right when the electronic device 101 is viewed from the front. However, the extending direction of the display 203 is not limited to one direction (e.g., left direction), but design changes may be made so that the display 203 is extendable to the left and/or in two directions.

The state shown in FIG. 2 may be defined as a first housing 201 being closed with respect to a second housing 202, and the state shown in FIG. 2 may be defined as the first housing 201 being open with respect to the second housing 202. According to an embodiment, the "closed state" or "opened state" may be defined as a closed or opened state of the electronic device.

Referring to FIGS. 2 and 3, the electronic device 101 may include housings 201 and 202. The housings 201 and 202 may include a second housing 202 and a first housing 201 movably disposed with respect to the second housing 202. According to an embodiment, the electronic device 101 may be interpreted as having a structure in which the second housing 202 is slidably disposed on the first housing 201. According to an embodiment, the first housing 201 may be disposed to perform reciprocating motion by a predetermined distance in the shown direction with respect to the second housing 202, for example, a direction indicated by the arrow q. The configuration of the electronic device 101 of FIGS. 2 and 3 may be identical in whole or part to the configuration of the electronic device 101 of FIG. 1.

According to an embodiment, the first housing 201 may be referred to as, for example, a first structure, a slide unit, or a slide housing, and may be disposed to reciprocate on the second housing 202. According to an embodiment, the first housing 201 may receive various electrical/electronic components, such as a circuit board or a battery. The second housing 202 may be referred to as, e.g., a second structure, a main part, or a main housing, and may guide the movement of the first housing 201. A portion (e.g., the first display area A1) of the display 203 may be seated on the first housing 201. According to an embodiment, another portion (e.g., the second display area A2) of the display 203 may be received into the inside of the second housing 202 (e.g., a slide-in motion) or be exposed to the outside of the second housing 202 (e.g., a slide-out motion) as the first housing 201 moves (e.g., slides) with respect to the second housing 202. According to an embodiment, a motor, a speaker, a sim socket, and/or a sub circuit board electrically connected with a main circuit board may be disposed in the first housing 201. A main circuit board on which electrical components, such as an application processor (AP) and a communication processor (CP) are mounted may be disposed in the second housing 202.

According to an embodiment, the first housing 201 may include a first plate 211 (e.g., a slide plate). The first plate 211 may include a first surface (e.g., the first surface F1 of FIG. 3) forming at least a portion of the first plate 211 and a second surface F2 facing away from the first surface F1. According to an embodiment, the first plate 211 may support at least a portion of the display 203 (e.g., the first display area A1). According to an embodiment, the first housing 201 may include a first plate 211, a 1-1th sidewall 211a extending from the first plate 211, a 1-2th sidewall 211b extending from the 1-1th sidewall 211a and the first plate 211, and a 1-3th sidewall 211c extending from the 1-1th sidewall 211a and the first plate 211 and positioned substantially parallel to the 1-2th sidewall 211b.

According to an embodiment, the second housing 202 may include a second plate 221 (e.g., main case), a 2-1th sidewall 221a extending from the second plate 221, a 2-2th sidewall 221b extending from the 2-1th sidewall 221a and the second plate 221, and a 2-3th sidewall 221c extending from the 2-1th sidewall 221a and the second plate 221 and disposed substantially parallel to the 2-2th sidewall 221b. According to an embodiment, the 2-2th sidewall 221b and the 2-3th sidewall 221c may be formed substantially perpendicular to the 2-1th sidewall 221a. According to an embodiment, the second plate 221, the 2-1th sidewall 221a, the 2-2nd sidewall 221b, and the 2-3th sidewall 221c may be formed to have an opening in one surface (e.g., the front surface) to receive at least a portion of the first housing 201. For example, the first housing 201 may be coupled to the second housing 202 in a state in which it is at least partially surrounded, and the first housing 201 may be slide in a direction parallel to the first surface F1 or the second surface F2, for example, direction indicated with the arrow. According to an embodiment, the second plate 221, the 2-1th sidewall 221a, the 2-2th sidewall 221b, and/or the 2-3th sidewall 221c may be integrally formed. According to another embodiment, the second plate 221, the 2-1th sidewall 221a, the 2-2th sidewall 221b, and/or the 2-3th sidewall 221c may be formed as separate housings and be combined or assembled.

According to an embodiment, the second plate 221 and/or the 2-1th sidewall 221a may cover at least a portion of the display 203. For example, at least a portion of the display 203 may be received in the second housing 202. The second plate 221 and/or the 2-1th sidewall 221a may cover a portion of the flexible display 203 received in the second housing 202.

According to an embodiment, the first housing 201 may be moved into an opened state and closed state with respect to the second housing 202 in a first direction (e.g., direction ① parallel to the 2-2th sidewall 221b or the 2-3th sidewall 221c. The first housing 201 may be moved to be positioned at a first distance from the 2-1th sidewall 221a in the closed state. In the opened state, the first housing 201 may be moved to be positioned at a second distance greater than the first distance from the 2-1th sidewall 221a. In some embodiments, in the closed state, the first housing 201 may surround a portion of the 2-1th sidewall 221a.

According to an embodiment, the electronic device 101 may include a display 203, a key input device 241, a connector hole 243 (e.g., a jack), audio modules 247a and 247b, or camera modules 249a and 249b. Although not shown, the electronic device 101 may further include an indicator (e.g., a light emitting diode (LED) device) or various sensor modules. The configuration of the display 203, audio modules 247a and 247b, and camera modules 249a and 249b of FIGS. 2 and 3 may be identical in whole or part to the configuration of the display module 160, the audio module 170, and the camera module 180 of FIG. 1.

According to an embodiment, the display 203 may include a first display area A1 and a second display area A2. According to an embodiment, the first display area A1 may be disposed on the second housing 202. The second display area A2 may extend from the first display area A1 and, as the first housing 201 slides, the second display area A2 may be inserted or received in the second housing 202 (e.g., structure) or exposed to the outside of the second housing 202.

According to an embodiment, the second display area A2 may be substantially moved while being guided by an area (e.g., the curved surface 250 of FIG. 4) of the first housing 201 and may be thus received in, or exposed to the outside of, the second housing 202 or a space formed between the first housing 201 and the second housing 202. According to an embodiment, the second display area A2 may move based on a slide of the first housing 201 in the first direction (e.g., the direction indicated by the arrow q). For example, while the first housing 201 slides, a portion of the second display area A2 may be deformed into a curved shape in a position corresponding to the curved surface 250 of the first housing 201.

According to an embodiment, when viewed from above the first plate 211 (e.g., slide plate), if the first housing 201 moves from the closed state to the opened state, the second display area A2 may be exposed to the outside of the second housing 202 to be substantially coplanar with the first display area A1. The display 203 may be disposed to be coupled with, or adjacent, a touch detecting circuit, a pressure sensor capable of measuring the strength (pressure) of touches, and/or a digitizer for detecting a magnetic field-type stylus pen. In one embodiment, the second display area A2 may be at least partially received inside the second housing 202, and a portion of the second display area A2 may be visually exposed to the outside even in the state shown in FIG. 2 (e.g., the closed state). According to an embodiment, irrespective of the closed state or the opened state, the exposed portion of the second display area A2 may be positioned on a portion (e.g., the curved surface 250 of FIG. 4) of the first housing, and a portion of the second display area A2 may remain in the curved shape in the position corresponding to the curved surface 250.

According to one of an embodiment, the electronic device 200 may include at least one hinge structure 240. The hinge structure 240 may connect the first housing 201 with the second housing 202. For example, the hinge structure 240 may be connected to the first plate 211 and the second plate 221. According to an embodiment, the hinge structure 240 may transfer a driving force for guiding the slide of the first housing 201 to the first housing 201. For example, the hinge structure 240 may include an elastic material (e.g., a spring) and, based on the slide of the first housing 201, provide an elastic force in the first direction (e.g., direction ① of FIG. 3). According to an embodiment, the hinge structure 240 may be excluded.

According to an embodiment, the key input device 241 may be positioned in one area of the first housing 201. Depending on the appearance and the state of use, the electronic device 101 may be designed to omit the illustrated key input device 241 or to include additional key input device(s). According to an embodiment, the electronic device 101 may include a key input device (not shown), e.g., a home key button or a touchpad disposed around the home key button. According to another embodiment, at least a portion of the key input device 241 may be disposed on the 2-1th sidewall 221a, the 2-2th sidewall 221b, or the 2-3th sidewall 221c of the second housing 202.

According to an embodiment, the connector hole 243 may be omitted or may receive a connector (e.g., a universal serial bus (USB) connector) for transmitting and receiving power and/or data with an external electronic device. Although not shown, the electronic device 101 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 123c but is not limited thereto. The connector hole 243 or a connector hole not shown may be disposed in the 2-1th sidewall 221a or the 2-2th sidewall 221b.

According to an embodiment, the audio modules 247a and 247b may include at least one speaker hole 247a or at least one microphone hole 247b. One of the speaker holes 247a may be provided as a receiver hole for voice calls, and the other may be provided as an external speaker hole. The electronic device 101 may include a microphone for obtaining sound. The microphone may obtain external sound of the electronic device 101 through the microphone hole 247b. According to an embodiment, the electronic device 101 may include a plurality of microphones to detect the direction of sound. According to an embodiment, the electronic device 101 may include an audio module in which the speaker hole 247a and the microphone hole 247b are implemented as one hole or may include a speaker without the speaker hole 247a (e.g., a piezo speaker).

According to an embodiment, the camera modules 249a and 249b may include a first camera module 249a and a second camera module 249b. The second camera module 249b may be positioned in the first housing 201 and may capture a subject in a direction opposite to the first display area A1 of the display 203. The electronic device 101 may include a plurality of camera modules 249a and 249b. For example, the electronic device 101 may include at least one of a wide-angle camera, a telephoto camera, or a close-up camera. According to an embodiment, the electronic device 200 may measure the distance to the subject by including an infrared projector and/or an infrared receiver. The camera modules 249a and 249b may include one or more lenses, an image sensor, and/or an image signal processor. The first camera module 249a may be disposed to face in the same direction as the display 203. For example, the first camera module 249a may be disposed in an area overlapping the display 203 or around the first display area A1 and, when disposed in the area overlapping the display 203, the first camera module 249a may capture the object through the display 203. According to an embodiment, the first camera module 249a may include an under display camera (UDC) that has a screen display area (e.g., the first display area A1) that may not be visually exposed but hidden.

According to an embodiment, an indicator (not shown) of the electronic device 101 may be disposed on the first housing 201 or the second housing 202, and the indicator may include a light emitting diode to provide state information about the electronic device 101 as a visual signal. The sensor module (not shown) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
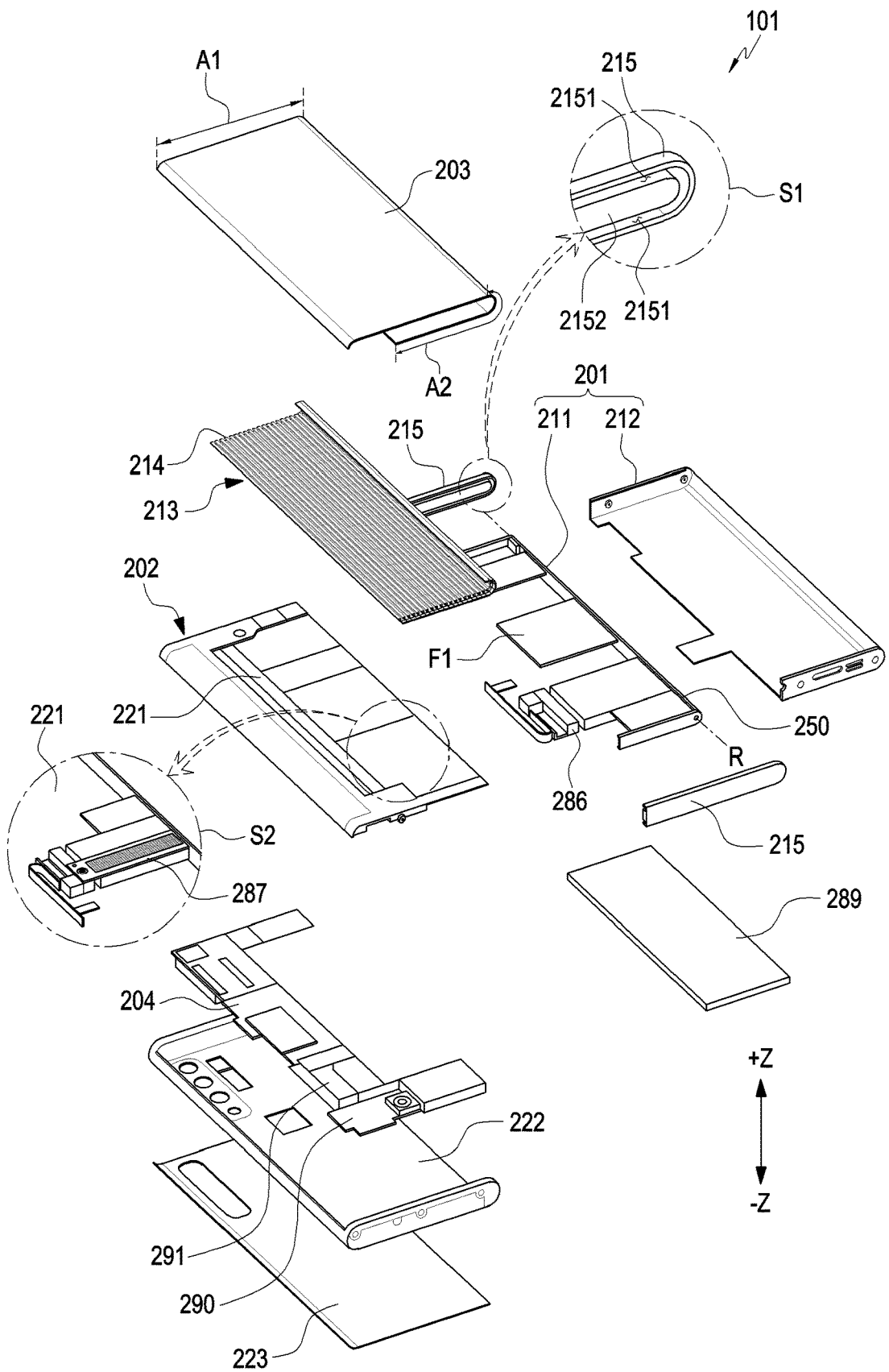
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, the electronic device 101 may include a first housing 201, a second housing 202, a display 203 (e.g., a flexible display, a foldable display, or a rollable display), and/or a supporting structure 213 (e.g., an articulated hinge structure). A portion (e.g., the second display area A2) of the display 203 may be received in the electronic device 101 along the curved surface 250 of the first housing 201.

The configuration of the first housing 201, the second housing 202, and the display 203 of FIG. 4 may be identical in whole or part to the configuration of the first housing 201, the second housing 202, and the display 203 of FIGS. 2 and 3.

According to an embodiment, the first housing 201 may include a first plate 211 and a slide cover 212. The first plate 211 and the slide cover 212 may be mounted (e.g., at least partially connected) on the second housing 202 and be reciprocated in one direction (e.g., display η indicated by the arrow in FIGS. 2 and 3) while being guided by the second housing 202. According to an embodiment, the first plate 211 may support the display 203. For example, the first plate 211 may include a first surface F1. The first display area A1 of the display 203 may be substantially positioned on the first surface F1 to maintain a flat panel shape. The slide cover 212 may protect the display 203 positioned on the first plate 211. For example, at least a portion of the display 203 may be positioned between the first plate 211 and the slide cover 212. According to an embodiment, the first plate 211 and the slide cover 212 may be formed of a metal material and/or a non-metal (e.g., polymer) material. According to an embodiment, the first plate 211 may receive at least some (e.g., the battery 289 (e.g., the battery 189 of FIG. 1), driving motor 286, and rack 287) of the components of the electronic device 101.

According to an embodiment, the supporting structure 213 may be connected with the first housing 201. For example, the supporting structure 213 may be positioned between the first plate 211 and the slide cover 212. According to an embodiment, as the first housing 201 slides, the supporting structure 213 may move with respect to the second housing 202. In the closed state (e.g., FIG. 2) of the supporting structure 213, most of the structure may be received in the second housing 202. According to an embodiment, at least a portion of the supporting structure 213 may move corresponding to the curved surface 250 positioned at the edge of the first housing 201.

According to an embodiment, the supporting structure 213 may include a plurality of bars (or rods) 214 and a guide rail 215. The plurality of bars 214 may extend in a straight line and be disposed parallel to the rotational axis R formed by the curved surface 250, and the plurality of bars 214 may be arranged along a direction substantially perpendicular to the rotational axis R (e.g., the direction along which the first housing 201 slides).

According to an embodiment, the guide rail 215 may guide the movement of the plurality of bars 214. The guide rail 215 may include an upper guide rail coupled with an upper end of the first plate 211 and connected with upper ends of the plurality of bars 214 and a lower guide rail coupled with a lower end of the first plate 211 and connected with lower ends of the plurality of bars 214. According to an embodiment, referring to a first enlarged area S1, when the plurality of bars 214 are bent or slid while moving along the curved surface 250, the upper ends and/or lower ends of the plurality of bars 214 may be moved while remaining fitted into the guide rail 215. For example, the plurality of bars 214 may be slid along a groove-shaped rail 2151 formed inside the guide rail 215, with their upper ends and/or lower ends fitted into the rail 2151.

According to an embodiment, as the motor 286 is driven (e.g., driven to slide out the display), the first plate 211 where the motor 286 is disposed may slide out, and a protrusion 2152 inside the guide rail 215 may push out the upper ends and/or lower ends of the plurality of bars 214 bent. Accordingly, the display 203 received between the first plate 211 and the slide cover 212 may be expanded to the front. According to an embodiment, as the motor 286 is driven (e.g., driven to slide in the display), the first plate 211 where the motor 286 is disposed may be slid in, and the outer portion (e.g., a portion other than the protrusion 2152) of the guide rail 215 may push out the upper and/or lower ends of the plurality of bars 214 bent. Accordingly, the expanded display 203 may be received between the first plate 211 and the slide cover 212.

According to an embodiment, the rack 287 may be disposed in the second housing 202 and guide the slide of the first housing 201 and the display 203. The second enlarged area S2 represents the rear surface (e.g., the surface facing the -Z axis) of the second plate 221. Referring to the second enlarged area S2, the rack 287 may be fixedly disposed on one surface (e.g., one surface facing the -Z axis) of the second plate 221 of the second housing 202 and may guide the gear connected to the driving motor 286 to move while rotating in the slide direction. According to another embodiment, the rack 287 may be disposed in the first housing 201, and the motor 286 may be disposed in the second housing 202. The rack 287 may guide the sliding motion of the first housing 202 and the display 203. For example, the rack 287 may be fixedly disposed on the first plate 211 of the first housing 201 and be rotated with the gear connected to the driving motor 286 disposed on the second plate 221 of the second housing 202 while sliding. According to an embodiment, the second housing 202 may include a second plate 221, a second plate cover 222, and a third plate 223. The second plate 221 may overall support the electronic device 101. The first plate 211 may be disposed on one surface of the second plate 221, and the printed circuit board 204 may be coupled to the other surface of the second plate 221. According to an embodiment, the second plate 221 may receive components (e.g., the battery 289 (e.g., the battery 189 of FIG. 1) and the circuit board 204) of the electronic device 101. The third plate cover 222 may protect various components positioned on the second plate 221.

According to an embodiment, a plurality of circuit boards may be received in the second housing 202. A processor, memory, and/or interface may be mounted on the circuit board 204 which is the main board. The processor may include one or more of, e.g., a central processing unit, an application processor, a graphic processing device, an image signal processing, a sensor hub processor, or a communication processor. According to an embodiment, the circuit board 204 may include a flexible printed circuit board type radio frequency cable (FRC). For example, the circuit board 204 may be disposed on at least a portion of the second plate 221 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the electronic device 101 may further include a separate sub circuit board 290 spaced apart from the circuit board 204 in the second housing 202. The sub circuit board 290 may be electrically connected with the circuit board 204 through the flexible circuit board 291. The sub circuit board 290 may be electrically connected with electrical components disposed in an end area of the electronic device, such as the battery 289 or a speaker and/or a sim socket, and may transfer signals and power.

According to an embodiment, the battery 289 may be a device for supplying power to at least one component of the electronic device 101. The battery 189 may include, e.g., a primary cell which is not rechargeable, a secondary cell which is rechargeable, or a fuel cell. At least a portion of the battery 289 may be disposed on substantially the same plane as the circuit board 204. The battery 289 may be integrally or detachably disposed inside the electronic device 101.

According to an embodiment, the battery 289 may be formed of a single embedded battery or may include a plurality of removable batteries. For example, when the embedded battery is positioned on the first plate 211, the embedded battery may move as the first plate 211 slides.

According to an embodiment, the third plate 223 may substantially form at least a portion of the exterior of the second housing 202 or the electronic device 101. For example, the third plate 223 may be coupled to the outer surface of the second plate cover 222. According to an embodiment, the third plate 223 may be integrally formed with the second plate cover 222. According to an embodiment, the third plate 223 may provide a decorative effect on the exterior of the electronic device 101. The second plate 221 and the second plate cover 222 may be formed of at least one of a metal or a polymer, and the third plate 223 may be formed of at least one of metal, glass, synthetic resin or ceramic. According to an embodiment, the second plate 221, the second plate cover 222 and/or the third plate 223 may be formed of a material that transmits light at least partially (e.g., the auxiliary display area). For example, in a state in which a portion of the display 203 (e.g., the second display area A2) is received in the electronic device 101, the electronic device 101 may output visual information using the second display area A2. The auxiliary display area may be a portion of the second plate 221, the second plate cover 222, and/or the third plate 223 in which the display 203 received in the second housing 202 is positioned.

Figure 5A:
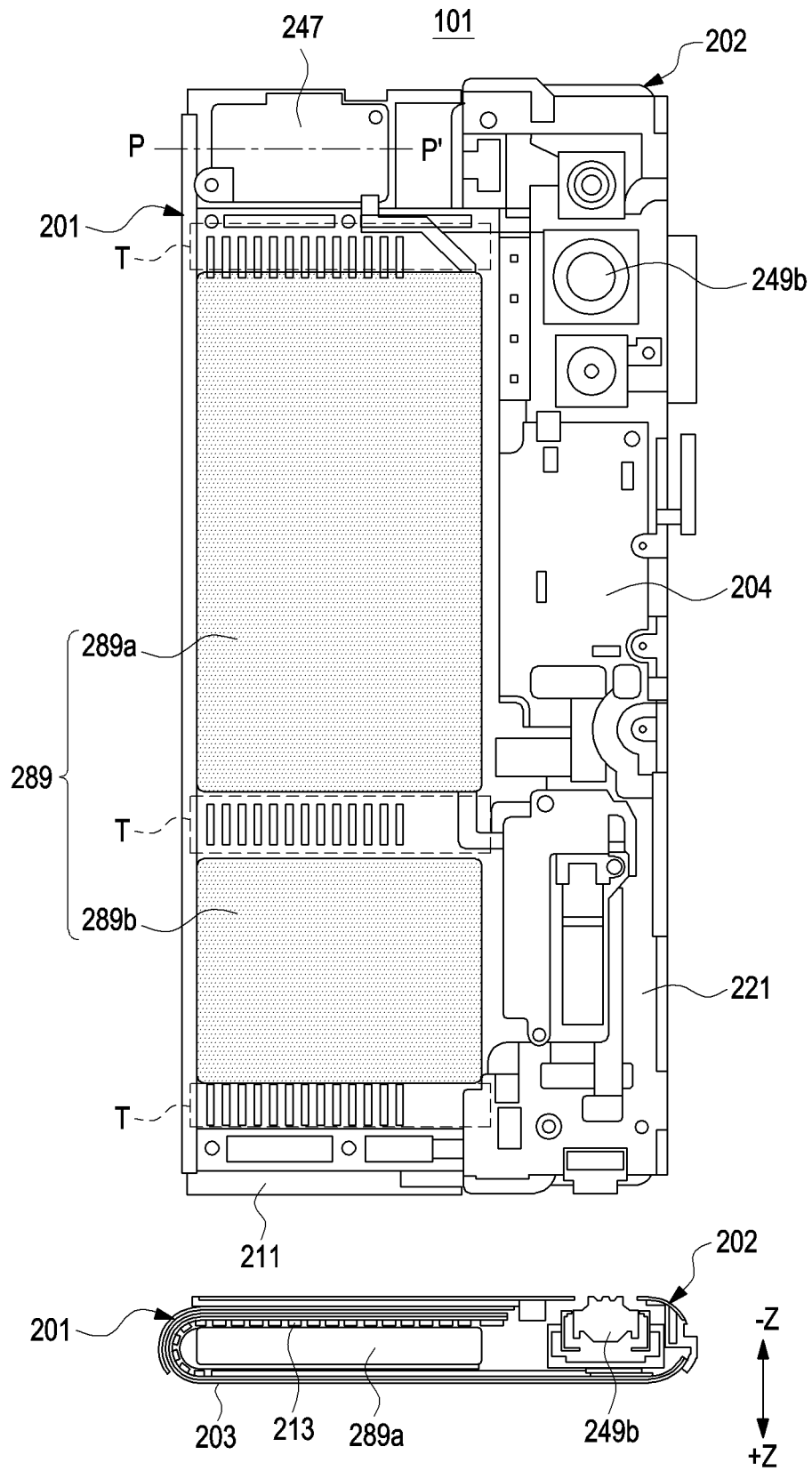
FIG. 5A is a view illustrating electrical components in an electronic device in a closed state of the electronic device according to an embodiment of the disclosure.

FIG. 5A is a view illustrating electrical components in an electronic device in a closed state of the electronic device according to an embodiment of the disclosure.

Figure 5B:
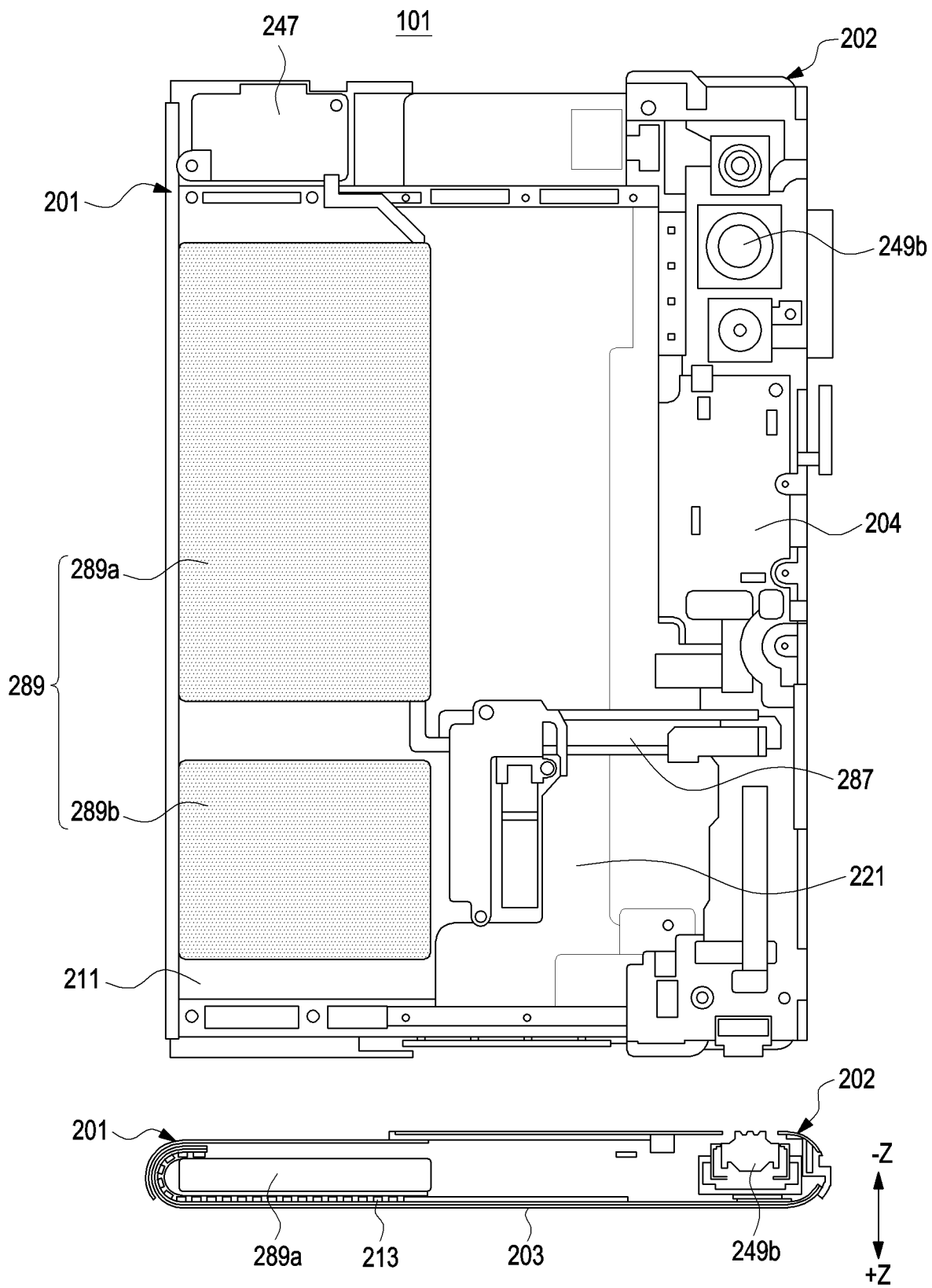
FIG. 5B is a view illustrating electrical components in an electronic device in an opened state of the electronic device according to an embodiment of the disclosure.

FIG. 5B is a view illustrating electrical components in an electronic device in an opened state of the electronic device according to an embodiment of the disclosure. FIGS. 5A and 5B are see-through views in the −Z-axis direction of FIG. 4.

Figure 6A:
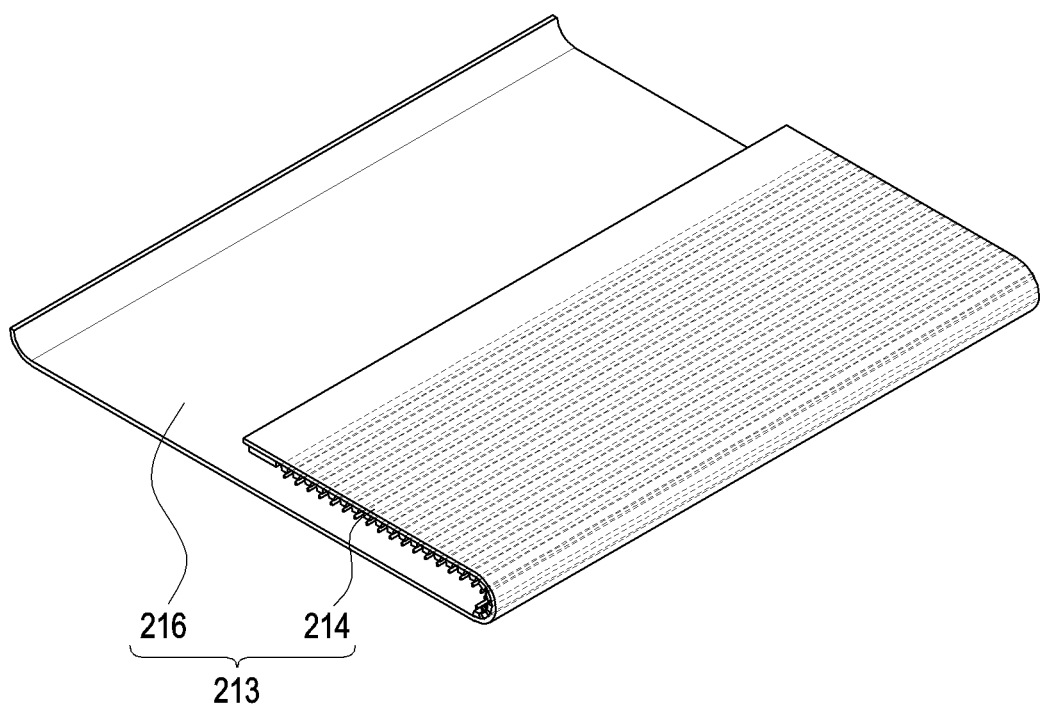
FIG. 6A is a perspective view illustrating a state of a supporting structure in a closed state of an electronic device according to an embodiment of the disclosure.

FIG. 6A is a perspective view illustrating a state of a supporting structure in a closed state of an electronic device according to an embodiment of the disclosure.

Figure 6B:
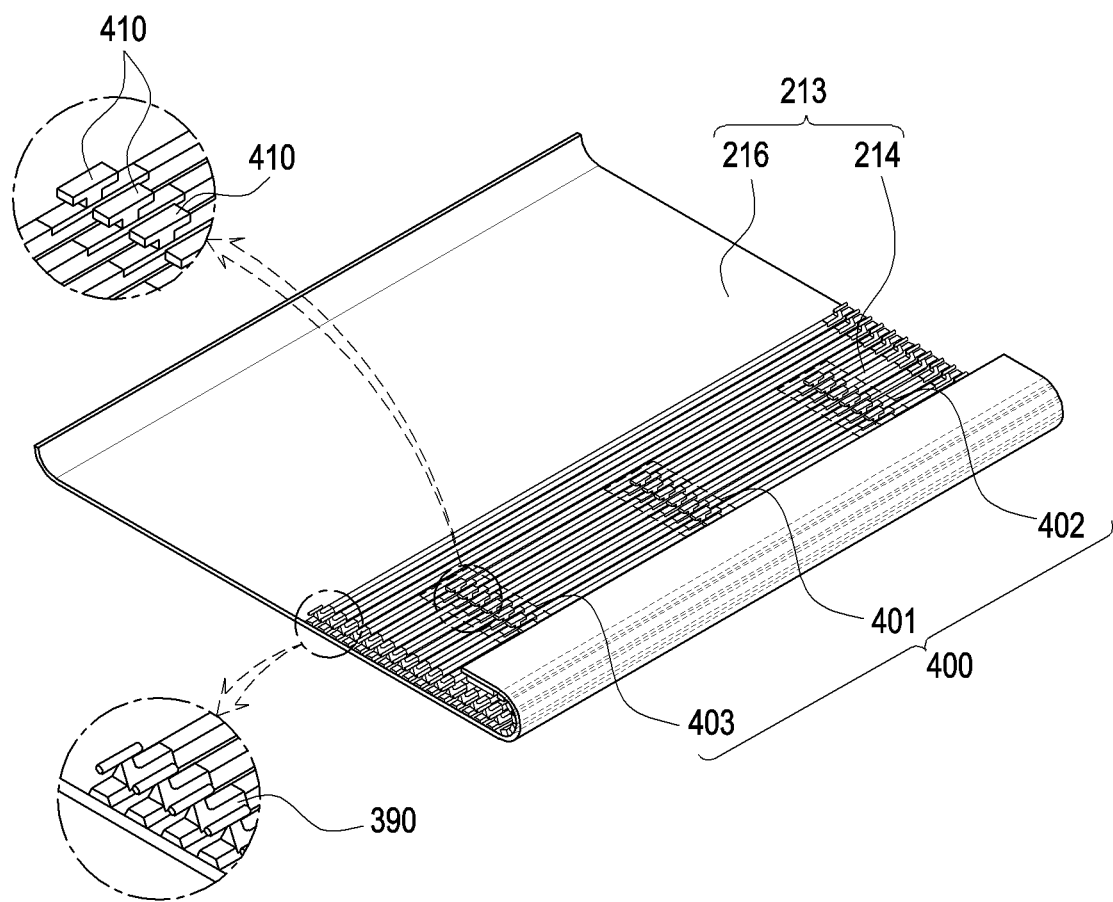
FIG. 6B is a perspective view illustrating a state of a supporting structure in an opened state of an electronic device according to an embodiment of the disclosure.

FIG. 6B is a perspective view illustrating a state of a supporting structure in an opened state of an electronic device according to an embodiment of the disclosure.

According to an embodiment, the electronic device 101 may include a first housing 201 (e.g., the first plate 211), a second housing 202 (e.g., the second plate 221), a display 203, a supporting structure 213, a battery 289 (e.g., the first battery 289a or the second battery 289b) and various components (e.g., the camera module 249b, speaker 247, rack 287, and printed circuit board 204). The configuration of the first housing 201, the second housing 202, the display 203, the supporting structure 213, and the battery 289 of FIGS. 5A, 5B, 6A, and 6B may be identical in whole or part to the configuration of the first housing 201, the second housing 202, the display 203, the supporting structure 213, and the battery 289 of FIG. 4.

According to an embodiment, as the supporting structure 213 and the display 203 (e.g., flexible display) connected with the supporting structure 213 slid in/out about the second plate 221, the electronic device 101 may turn into the closed state or opened state.

According to an embodiment, the electronic device 101 may provide a supporting structure 213 capable of seamlessly performing the slide-in/slide-out motion. For example, when the display 203 slides in/out, a flat area may turn into a bent (or rolled) area, or a bent (or rolled) area may turn into a flat area. The supporting structure 213 may include a plate portion 216 supporting the flat area (e.g., the first display area A1 of FIG. 4) of the display 203 and a plurality of bars 214 extending from the plate portion 216 and supporting the bendable area (e.g., the second display area A2 of FIG. 4) of the display 203.

According to an embodiment, the plurality of bars 214 may be bent (or rolled) with the display 203 and, as bent (or rolled), their position may be changed in the electronic device 101. The plurality of bars 214 may be disposed parallel to each other and may slide in response to the slide of the display 203. As the display 203 slides, the plurality of bars 310 may be arranged to form a curved shape or may be arranged to form a flat shape. For example, as the display 203 slides, a portion of the supporting structure 213 facing the curved surface 250 may form a curved surface, and another portion of the supporting structure 213 that does not face the curved surface 250 may form a flat surface.

According to an embodiment, the second display area A2 of the display 203 may be mounted or supported on the plurality of bars 214 of the supporting structure 213. In the slide-out state (e.g., FIG. 5B) of the display 203, at least a portion of the second display area A2 may be exposed along with the first display area A1. In the state in which the second display area A2 is exposed to the outside, some of the plurality of bars 214 of the supporting structure 213 may substantially form a flat surface, thereby supporting or maintaining the second display area A2 in the flat state. According to an embodiment, the combination of the plurality of bars 214 may be replaced with a bendable integral supporting member (not shown). However, the supporting member is not limited to a combination of the plurality of bars 214, and various design changes may be made thereto to be able to stably support the display 203, e.g., like one plate. For example, the supporting member may be a single plate formed of a flexible material. As another example, the single flexible plate may be formed to have different thicknesses according to designated intervals to provide flexibility corresponding to the display.

According to an embodiment, as the display 203 slides, at least some of the plurality of bars 214 may orbit around the battery 289. For example, in the slide-in state of the display 203, the plurality of bars 214 may be disposed to be spaced apart from each other along the side surface of the battery 289 from one surface (e.g., rear surface) in the -Z-axis direction of the battery 289. In the slide-out state of the display 203, the plurality of bars 214 may slide and be thus disposed to be spaced apart along the side surface of the battery 289 from one surface (e.g., front surface) in the +Z-axis direction of the battery 289.

According to an embodiment, a rib structure 400 may be disposed in at least a partial area of the plurality of bars 214 of the supporting structure 213 to limit the lift of the display 203 due to the slide-in/out motion of the display 203. According to an embodiment, the rib structure 400 may include an array of a plurality of ribs 410. The plurality of ribs 410 may be arranged along the slide direction on one surface of the plurality of bars 214. For example, the plurality of ribs 410 may be disposed respectively corresponding to the plurality of bars 214 or some of the plurality of bars 214. One rib 410 or a plurality of ribs 410 spaced apart from each other may be disposed on one rib 410.

According to an embodiment, the array of the plurality of ribs 410 of the rib structure 400 may be located in various positions depending on the position of the supporting structure 213. For example, the plurality of ribs 410 may form a first array 401 and a second array 402 in one area of the supporting structure 213. The first array 401 and the second array 402 may be positioned side-by-side along the length direction of the plurality of bars 214, which is perpendicular to the slide direction. When the first array 401 is positioned in the center of the plurality of bars 214, the second array 402 may be positioned in an upper area or lower area of the plurality of bars 214 spaced apart from the first array 401. As another example, the plurality of ribs 410 may form a first array 401, a second array 402, and a third array 403 in one area of the supporting structure 213. The first array 401 and the second array 402 may be positioned side-by-side along the length direction of the plurality of bars 214, which is perpendicular to the slide direction. When the first array 401 is positioned in the center of the plurality of bars 214, the second array 402 may be positioned in an upper area of the plurality of bars 214 spaced apart from the first array 401, and the third array 403 may be positioned in a lower area of the plurality of bars 214 spaced apart from the first array 401.

Figure 7:
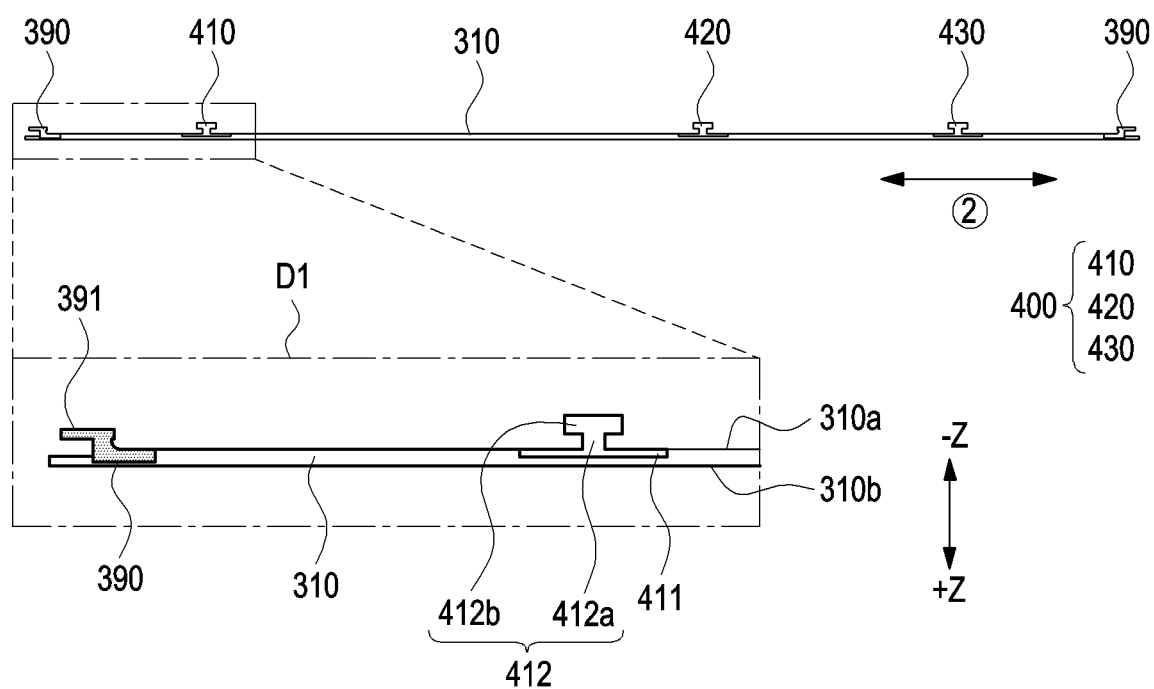
FIG. 7 is a cross-sectional view illustrating a rib structure and a supporting structure supporting a slide of a display according to an embodiment of the disclosure.

FIG. 7 is a cross-sectional view illustrating a rib structure and a supporting structure supporting a slide of a display according to an embodiment of the disclosure.

According to an embodiment, an electronic device 101 may include a display (e.g., the display 203 of FIG. 4), a supporting structure (e.g., the supporting structure 213 of FIGS. 6A and 6B) supporting the display 203, and a rib structure 400 providing enhanced bending of the display 203. The configuration of the supporting structure 213 and the rib structure 400 of FIG. 7 may be identical in whole or part to the configuration of the supporting structure 213 and the rib structure 400 of FIGS. 4 and 6A and 6B.

According to an embodiment, the supporting structure 213 may include a plurality of bars (e.g., the plurality of bars 214 in FIGS. 6A and 6B), and the rib structure 400 may be disposed in one area of the plurality of bars 214. One bar (hereinafter, the first bar 310) among the plurality of bars 214 and at least one rib structure 400 disposed on the first bar 310 are described below. The following description may apply to the other bars than the first bar 310 among the plurality of bars 214 and the rib structures disposed thereon.

According to an embodiment, the width of the first bar 310 may be disposed in the slide direction (e.g., the first direction ①), and the length thereof may be disposed in the second direction ② perpendicular to the slide direction (e.g., the first direction ①). For example, the length direction (e.g., the longitudinal direction) of the first bar 310 may be parallel to the second direction ② (e.g., the A-A' direction of FIG. 8A).

According to an embodiment, guide ends 390 (e.g., guide ends 390 of FIG. 6A) may be disposed on two opposite ends of the first bar 310. The guide ends 390 may slide along a recess-shaped rail (e.g., the rail 2151 of FIG. 4) formed in the guide rail (e.g., the guide rail 215 of FIG. 4). As sliding, with the protrusion 391 of the guide end 390 inserted in the rail 2151 of the guide rail 215, the first bar 310 may provide stable bending of the display 203 without departing off the designated range while sliding.

According to an embodiment, the display 203 may be disposed over the first surface 310a (e.g., the surface in the +Z-axis direction) of the first bar 310, and the rib structure 400 for connecting with the first plate 211 (e.g., the first plate 211 of FIG. 4) may be disposed on the second surface 310b (e.g., the surface in the −Z-axis direction) opposite to the first surface 310a. An adhesive member (not shown) may be disposed on the first surface 310a of the first bar 310 to support the display 203 while maintaining a strong bond.

According to an embodiment, the first rib structure 400 may include one or more ribs, and the plurality of ribs may be spaced apart from each other. For example, the plurality of ribs may include a first rib 410 disposed to be spaced apart from the guide end 390 on one end of the first bar 310, a second rib 420 disposed to be spaced apart from the guide end 390 on the other end of the first bar 310, and a third rib 430 disposed to be spaced apart between the first rib 410 and the second rib 420. The spacing between the guide ends 390 and the ribs (e.g., the first rib 410, the second rib 420, and the third rib 430) may be varied in design depending on the shape of the structures in the electronic device and the arrangement of the electrical components.

At the enlarged view of the portion D1, the first rib 410 may be positioned between the guide ends 390 disposed on two opposite ends of the first bar 310 and may include a fixing portion 411 to be fixed to the first bar 310 and a stepped portion 412 extending from the fixing portion 411 to the first plate 211. For example, the fixed portion 411 may be a first end portion of the first rib 410 and be formed to be coupled with a portion of the first bar 310. The stepped portion 412 may be a second end portion of the first rib 410, be positioned opposite to the first end, and be connected to be slidable with respect to the first plate 211. As the first rib 410 connected with the first plate 211 maintains the spacing between the first plate 211 and the display 203 constant, the lift of the display 203 during the slide-in/out motion of the display 203 may be limited.

According to an embodiment, the fixing portion 411 may be positioned in a recess formed in an area of the first bar 310. The stepped portion 412 may include a first portion 412a connected with the fixing portion 411 and a second portion 412b extending in a direction perpendicular to the first portion 412a. For example, the second portion 412b may extend in the second direction ② perpendicular to the slide direction (e.g., the first direction ①).

According to an embodiment, the second portion 412b may slide in a state inserted in the guide recess formed in the first plate 211. The second portion 412b may protrude from the first portion 412a in one direction or in two opposite directions. For example, the first portion 412a and the second portion 412b extending in two opposite directions from the first portion 412a may form a "T" shape. As another example, the fixing portion 411 may be formed parallel to the second portion 412b and longer than the second portion 412b, stably supporting the rib 410 disposed on the first bar 310.

According to an embodiment, the first bar 310 and the first rib 410 disposed on the first bar 310 may be designed in various shapes. For example, a recess may be formed in an area of the first bar 310, and the fixing portion 411 of the first rib 410 may be inserted thereto, and they may then be welded together. As another example, the first bar 310 and the first rib 410 may be integrally formed with each other.

Figure 8A:
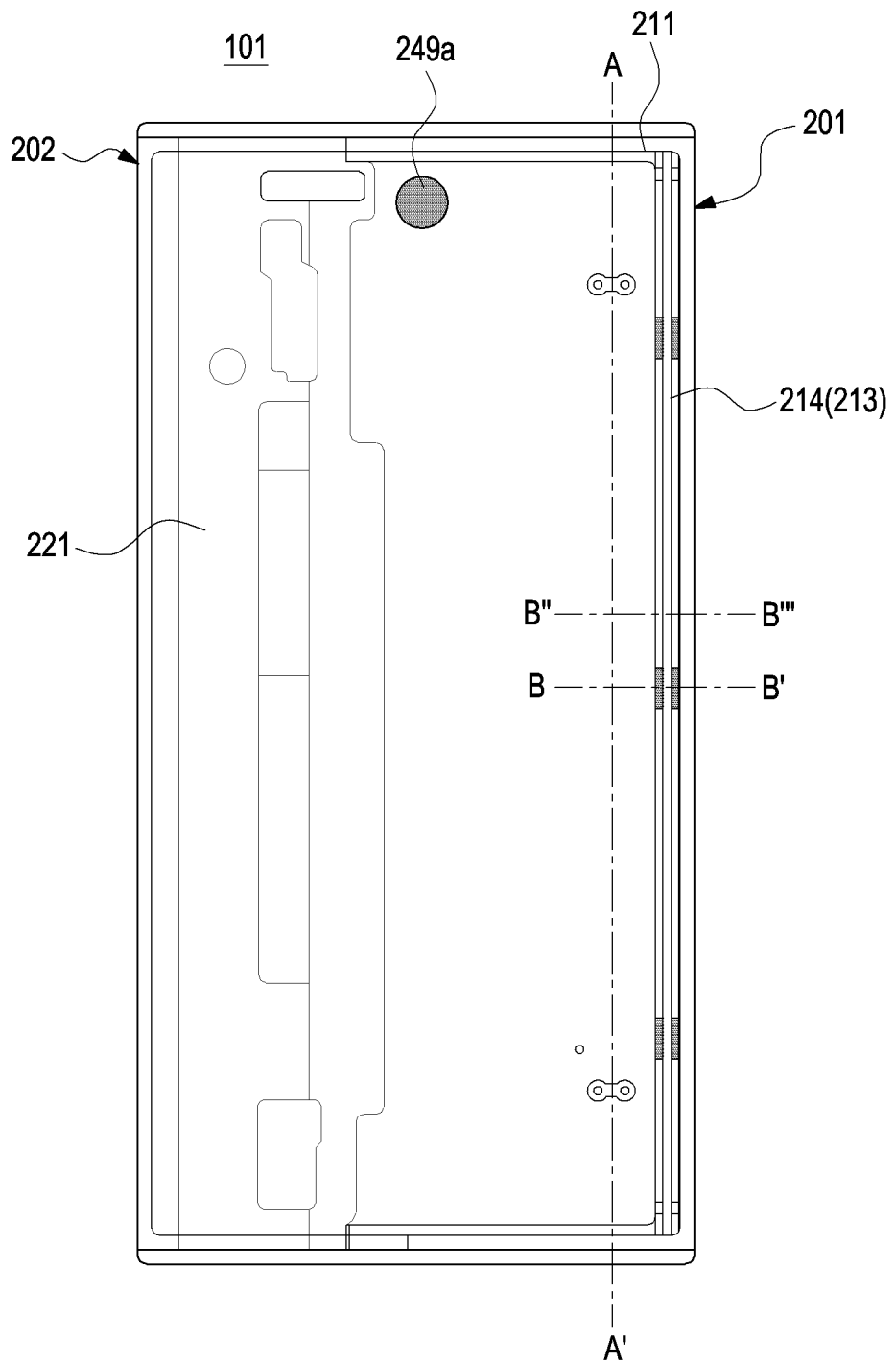
FIG. 8A is a view illustrating an inside of an electronic device to show a supporting structure in a closed state of the electronic device according to an embodiment of the disclosure.

FIG. 8A is a view illustrating an inside of an electronic device to show a supporting structure in a closed state of the electronic device according to an embodiment of the disclosure.

Figure 8B:
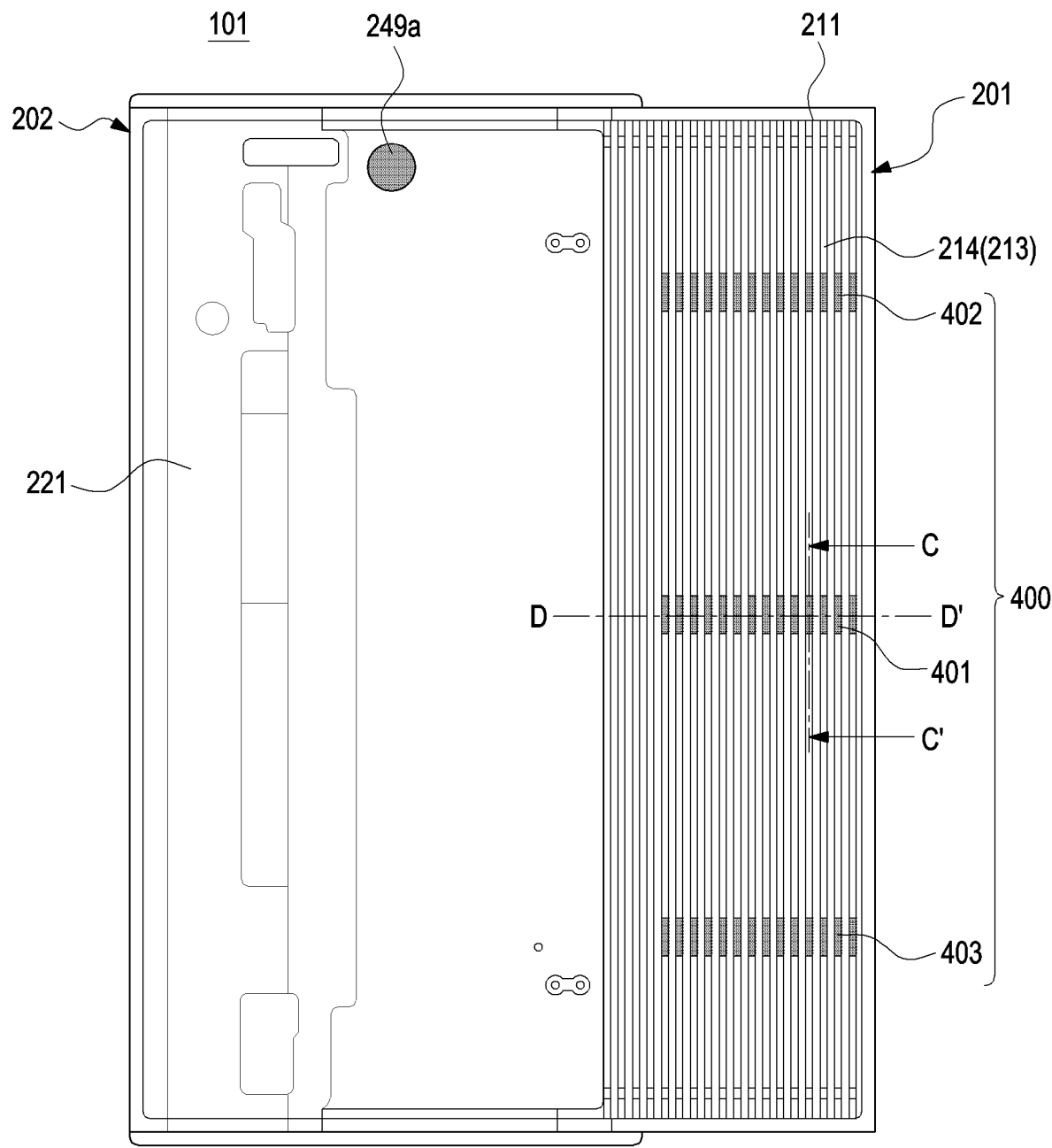
FIG. 8B is a view illustrating an inside of an electronic device to show a supporting structure in an opened state of the electronic device according to an embodiment of the disclosure.

FIG. 8B is a view illustrating an inside of an electronic device to show a supporting structure in an opened state of the electronic device according to an embodiment of the disclosure. FIGS. 8A and 8B are see-through views in the +Z-axis direction (e.g., display direction) of FIG. 4.

Figure 9A:
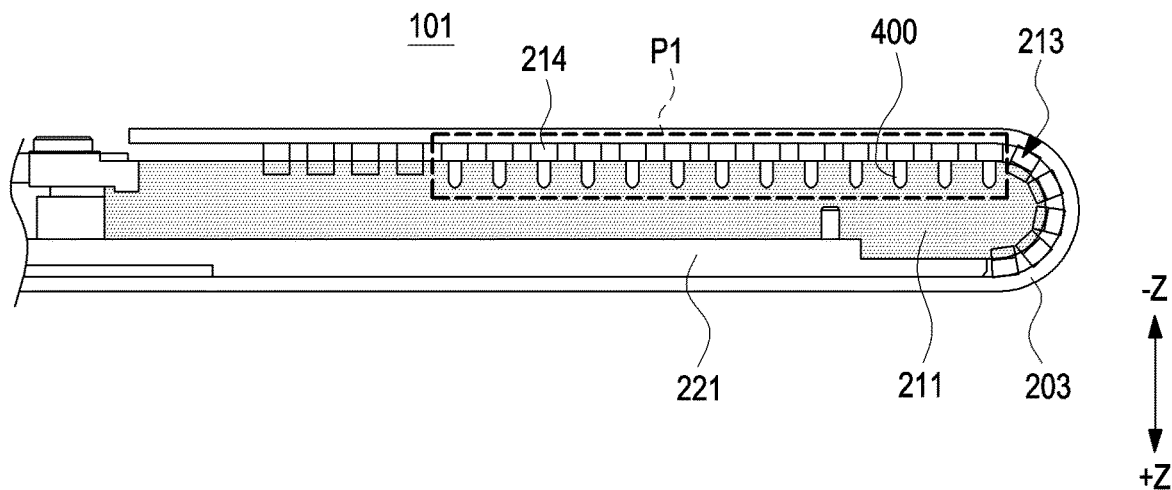
FIGS. 9A and 9B are cross-sectional views illustrating, in one direction, a supporting structure disposed between a display and a first plate in a closed state of an electronic device according to an embodiment of the disclosure.
Figure 9B:
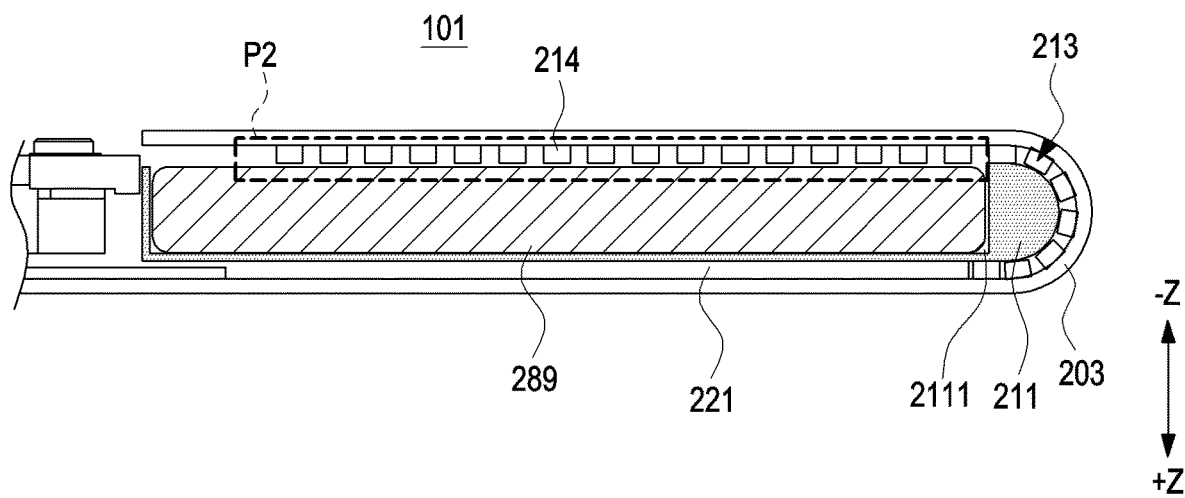

FIGS. 9A and 9B are cross-sectional views illustrating, in one direction, a supporting structure disposed between a display and a first plate in a closed state of an electronic device according to an embodiment of the disclosure.

Figure 10:
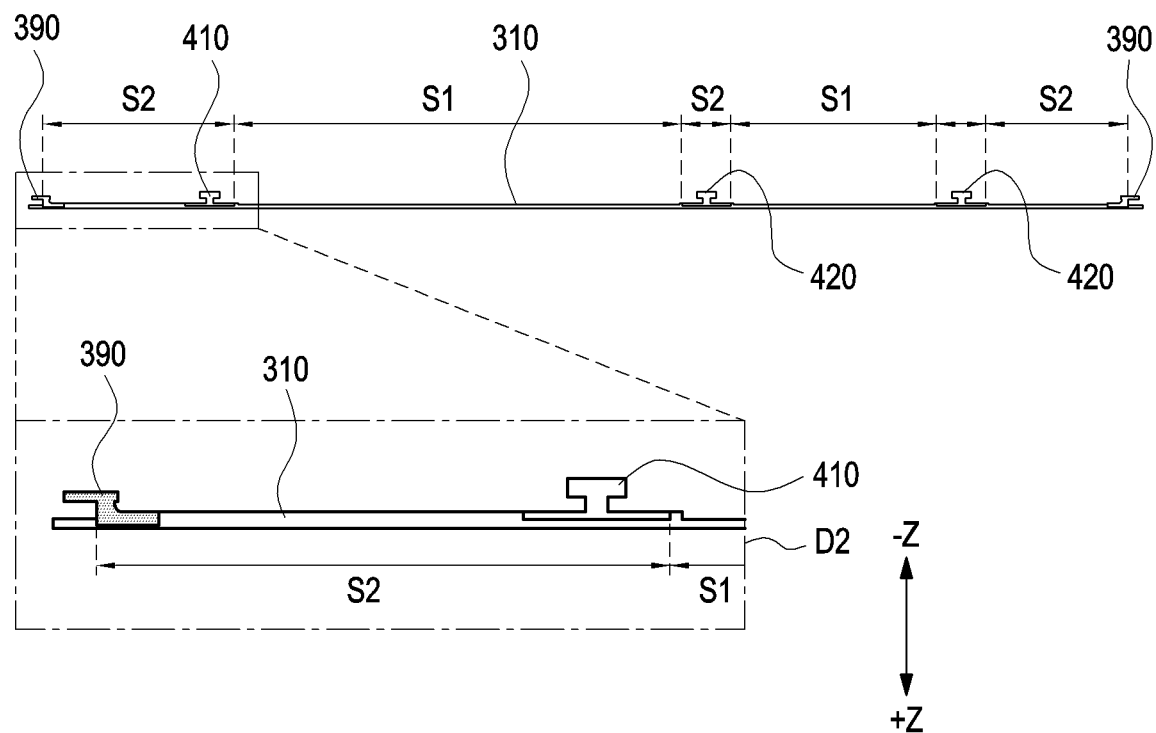
FIG. 10 is a cross-sectional view illustrating one multi-bar shape of a supporting structure supporting a slide of a display according to an embodiment of the disclosure.

FIG. 10 is a cross-sectional view illustrating one multi-bar shape of a supporting structure supporting a slide of a display according to an embodiment of the disclosure.

Figure 11A:
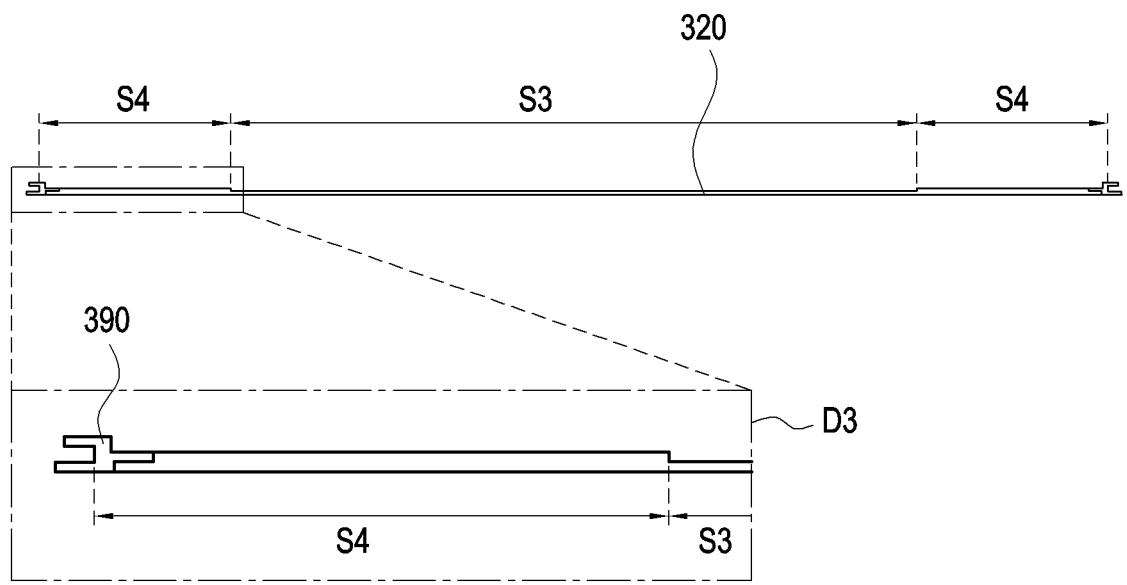
FIG. 11A is a cross-sectional view illustrating another multi-bar shape of a supporting structure supporting a slide of a display according to an embodiment of the disclosure.

FIG. 11A is a cross-sectional view illustrating another multi-bar shape of a supporting structure supporting a slide of a display according to an embodiment of the disclosure.

Figure 11B:
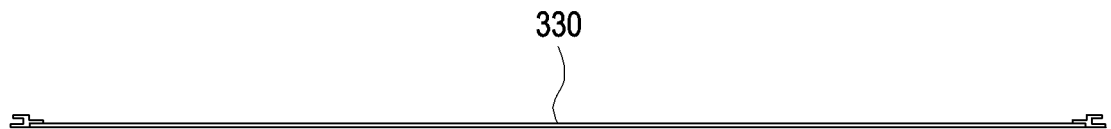
FIG. 11B is a cross-sectional view illustrating another multi-bar shape of a supporting structure supporting a slide of a display according to an embodiment of the disclosure.

FIG. 11B is a cross-sectional view illustrating another multi-bar shape of a supporting structure supporting a slide of a display according to an embodiment of the disclosure.

According to an embodiment, an electronic device 101 may include a first housing 201 (e.g., the first plate 211), a second housing 202 (e.g., the second plate 221), a supporting structure 213, a rib structure 400, and various components (e.g., the camera module 249a). The configuration of the first housing 201, the second housing 202, the display 203, the supporting structure 213, and the rib structure 400 of FIGS. 8A, 8B, 9, 10, 11A, and 11B may be identical in whole or part to the configuration of the first housing 201, the second housing 202, the display 203, the supporting structure 213, and the rib structure 400 of FIGS. 4, 6A, 6B, and 7. According to an embodiment, the supporting structure 213 may include a plurality of bars 214. At least some of the plurality of bars 214 may be designed to be machined in thickness considering the arrangement relationship with the internal structure of the electronic device 101. According to an embodiment, all of the plurality of bars 214 may be designed to be machined in thickness. According to an embodiment, considering whether it overlaps the internal structure (e.g., the battery 289) of the electronic device 101, only some of the plurality of bars 214 may be designed to be machined in thickness.

According to an embodiment, the rib structure 400 may be formed depending on whether the plurality of bars 214 overlap the internal structure (e.g., the battery 289) of the electronic device 101. For example, the plurality of bars 214 may include a first bar 310 and a second bar 320. The first bar 310 may include a rib structure 400 without overlapping the internal structure (e.g., the battery 289) of the electronic device 101. The second bar 320 overlaps the internal structure (e.g., the battery 289) of the electronic device 101 and may not include a rib structure.

According to an embodiment, the rib structure 400 may be disposed regardless of whether the plurality of bars 214 overlap the internal structure (e.g., the battery 289) of the electronic device 101. For example, the plurality of bars 214 may include a third bar and a fourth bar. The third bar may overlap the internal structure (e.g., the battery 289) of the electronic device 101 and include a rib structure 400. The fourth bar overlaps the internal structure (e.g., the battery 289) of the electronic device 101 and may not include a rib structure 400. As another example, at least one of the third bar and the fourth bar may not include a rib structure 400 without overlapping the internal structure (e.g., the battery 289) of the electronic device 101. As another example, at least one of the third bar and the fourth bar may include a rib structure 400 without overlapping the internal structure (e.g., the battery 289) of the electronic device 101.

FIG. 9A is a cross-sectional view taken along B-B' of FIG. 8A, and FIG. 9B is a cross-sectional view taken along B"-B'" of FIG. 9B.

According to an embodiment, the first plate 211 may include a seating recess 2111. The battery 289 may be seated in the seating recess 2111. In the slide-in state of the display 203, the first surface facing the +Z-axis of the battery 289 seated in the seating recess 2111 may face the second plate 221 with the first plate 211 interposed therebetween. In the slide-in state of the display 203, the second surface facing the −Z-axis of the battery 289 seated in the seating recess 2111 may face the display 203 with the supporting structure 213 interposed therebetween. According to an embodiment, the supporting structure 213 may determine whether to process depending on the arrangement relationship with the surrounding structure. Referring to FIG. 9A, the plurality of bars 214 of the supporting structure 213 may be processed so that the rib structure 400 is formed in a partial area P1 in an area that does not overlap the battery 289. Referring to FIG. 9B, thickness machining may be conducted in one area P2 of some bars overlapping the first surface facing the +Z axis of the battery 289 among the plurality of bars 214 of the supporting structure 213. For example, the thickness of the battery 289 may be increased as the thickness of some bars in the area P2 is reduced.

The rib structure 400 and thickness machining in at least some of the plurality of bars 214 requiring machining are described below with reference to FIG. 10. According to an embodiment, the rib structure 400 may be disposed in at least one area of the plurality of bars 214. One bar (hereinafter, the first bar 310) among the plurality of bars 214 and at least one rib structure 400 disposed on the first bar 310 are described below. The following description may apply to the other bars than the first bar 310 among the plurality of bars 214 and the rib structures disposed thereon.

According to an embodiment, guide ends 390 may be disposed on two opposite ends of the first bar 310. The guide ends 390 may slide along a recess-shaped rail (e.g., the rail 2151 of FIG. 4) formed in the guide rail (e.g., the guide rail 215 of FIG. 4).

According to an embodiment, the display (e.g., the display 203 of FIG. 4) may be disposed over the first surface 310a (e.g., the surface in the +Z-axis direction) of the first bar 310, and the rib structure 400 for connecting with the first plate 211 may be disposed on the second surface 310b (e.g., the surface in the −Z-axis direction) opposite to the first surface 310a.

According to an embodiment, the first bar 310 may be formed to have different thicknesses depending on areas. Referring to FIG. 10, the first bar 310 may include first areas S1 where the plurality of ribs 410 (e.g., the first rib 410, the second rib 420, and the third rib 430) are not disposed and second areas S2 where the plurality of ribs 410 are disposed. The first areas S1 may form a first thickness. The second areas S2 may have a second thickness larger than the first thickness. For example, the thickness of the first areas S1 may be about 0.55 mm to 0.65 mm. The thickness of the second areas S2 may be about 0.75 to 0.85 mm. As another example, the thickness of the first areas S1 may be about 0.6 mm. The thickness of the second areas S2 may be about 0.8 mm.

According to an embodiment, to optimize the mounting space, e.g., to increase the mounting space of an electrical component, such as a battery, the first bar 310 may need to be reduced in thickness in the area overlapping the battery. Thus, the first areas S1 overlapping the battery may be implemented to be set to have a minimum thickness to support the display 203. For example, referring to FIG. 5A, the first areas S1 may be positioned in an area overlapping the batteries 289a and 289b, and the second areas S2 may be positioned in an area T not overlapping the batteries 289a and 289b.

As the supporting structure 213 slides while substantially surrounding the front and rear surfaces of the battery 289, if the thickness of the first bar 310 is reduced, the capacity of the battery 289 may be utilized in twice as large a space as the reduction in thickness of the first bar 310. At the enlarged view of the portion D2, since the second areas S2 where the plurality of ribs 410 are disposed may require a designated thickness space to fix (e.g., weld) each rib 410 to the first bar 310, the second areas S2 may be formed to be relatively thicker than the first areas S1. Since some of the second areas S2 may require a designated thickness space to fix (e.g., weld) the guide ends 390 on two opposite ends of the first bar 310 to the first bar 310, they may be formed to be relatively thicker than the first areas S1.

Whether to form a rib structure 400 and thickness machining in at least some of the plurality of bars 214 requiring machining are described below with reference to FIGS. 11A and 11B.

Referring to FIG. 11A, the second bar 320 (e.g., the A1th array A1 and/or A3th array A3 of FIGS. 18A and 18B) where no rib structure 400 is disposed may be divided into a third area S3 and a fourth area S4 depending on whether it overlaps an electrical component (e.g., battery). For example, the second bar 320 may include a third area S3 overlapping an electrical component and a fourth area S4 not overlapping an electrical component. The thickness of the third area S3 for an electrical component to be mounted may be smaller than the thickness of the fourth area S4. For example, the thickness of the third area S3 may be about 0.55 mm to 0.65 mm. The thickness of the fourth area S4 may be about 0.75 to 0.85 mm. As another example, the thickness of the third area S3 may be about 0.6 mm. The thickness of the fourth area S4 may be about 0.8 mm. At the enlarged view of the portion D3, since a portion of the fourth area S4 may require a designated thickness space to stably fix (e.g., weld) the guide ends 390 on two opposite ends of the first bar 310 to the second bar 320, they may be formed to be relatively thicker than the third area S3. The second bar 320 may be manufactured to have the same thickness, followed by forming some area (e.g., the third area S3) by machining, or the second bar 320 may be formed to have different thicknesses in their respective areas when manufactured.

Referring to FIG. 11B, the third bar 330 (e.g., the A1th array A1 and/or the A3th array A3 of FIGS. 18A and 18B) where no rib structure 400 is disposed may be formed to be overall thin to increase the thickness of an electrical component (e.g., battery 289). For example, the third bar 330 may be formed to have a thickness corresponding to the first area S1 of the first bar 310 where the rib structure 400 is disposed. For example, the thickness of the third bar 330 may be about 0.55 mm to 0.65 mm as a whole. As another example, the thickness of the third bar 330 may be about 0.6 mm overall.

Figure 12:
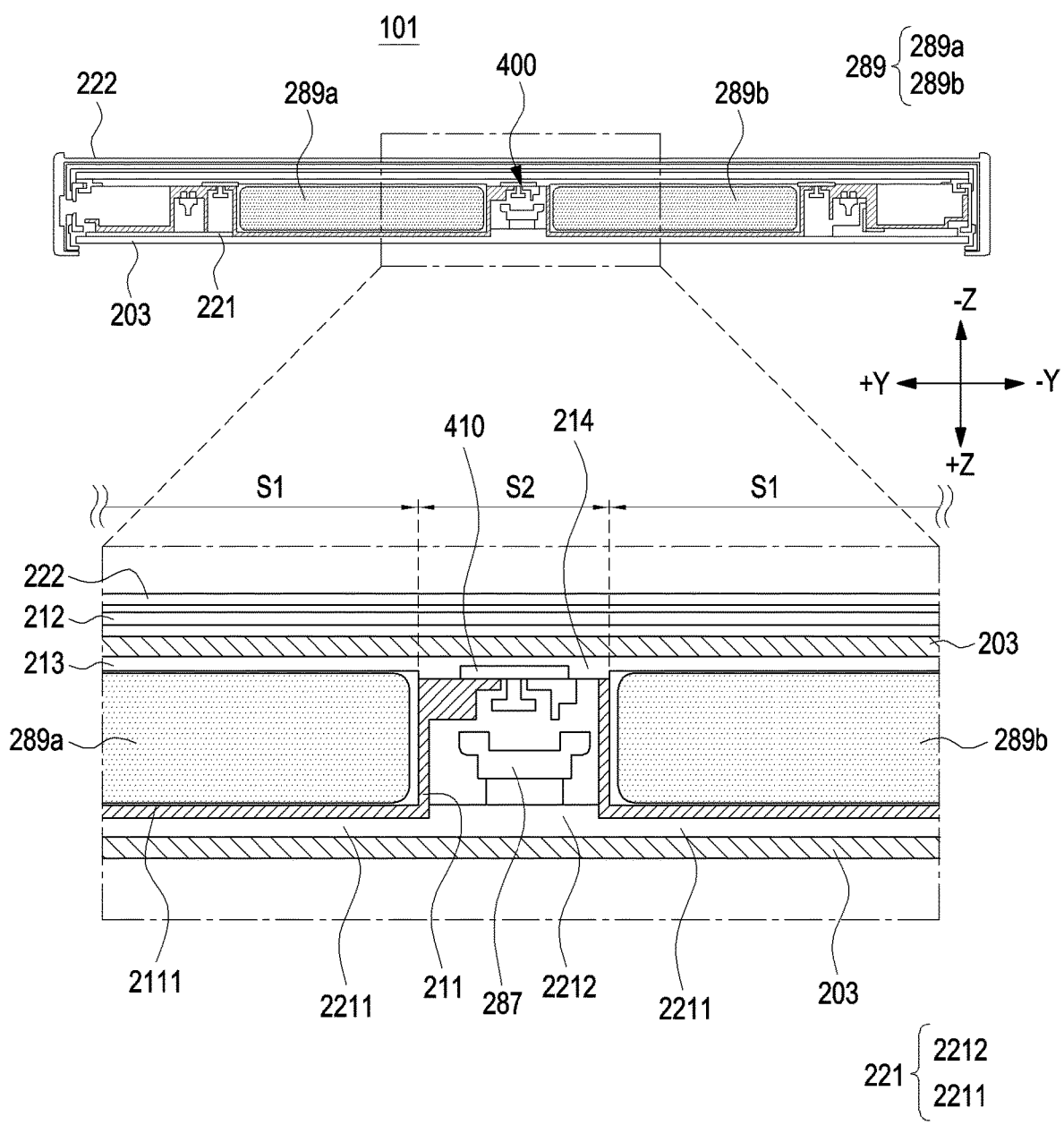
FIG. 12 is a cross-sectional view illustrating, in another direction, a supporting structure disposed between a display and a first plate in a closed state of an electronic device according to an embodiment of the disclosure.

FIG. 12 is a cross-sectional view illustrating, in another direction, a supporting structure disposed between a display and a first plate in a closed state of an electronic device according to an embodiment of the disclosure.

Figure 13:
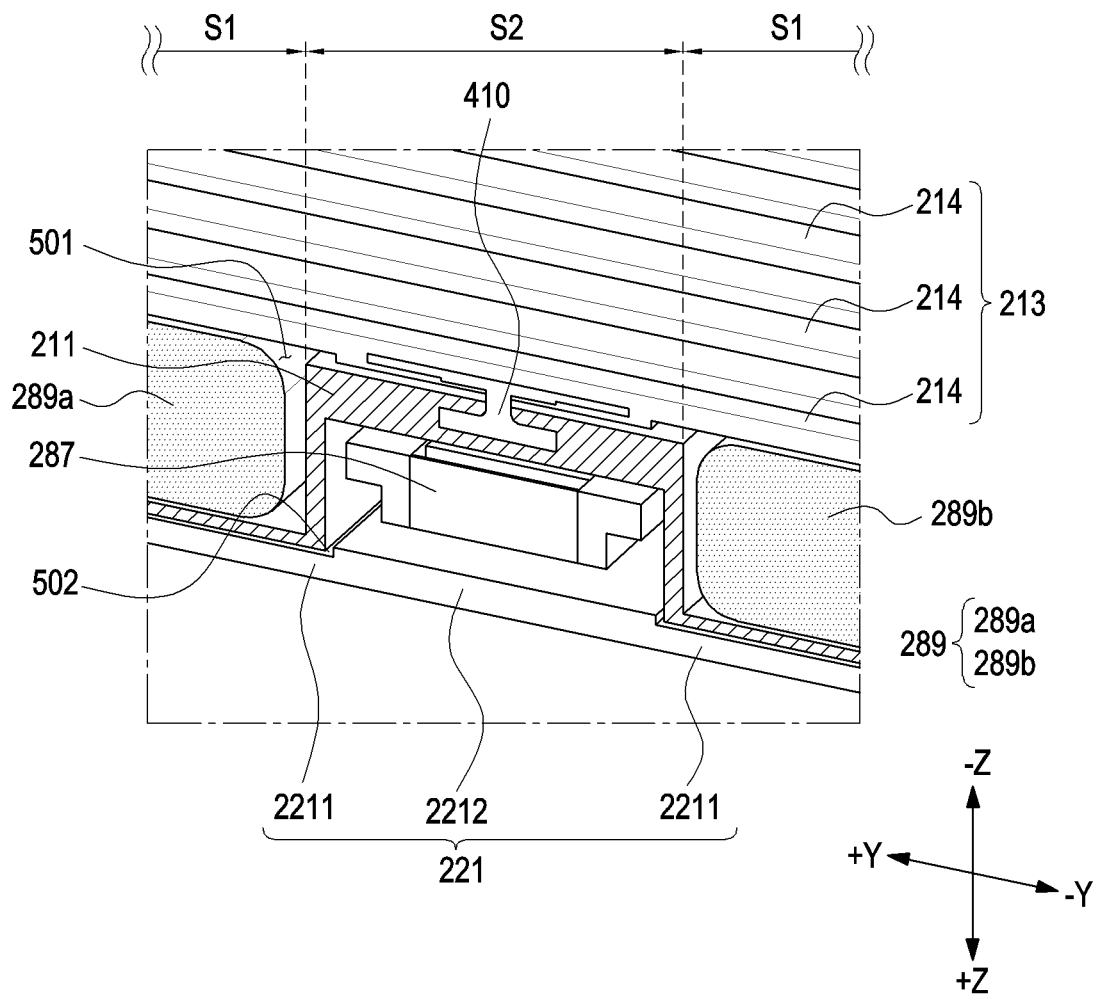
FIG. 13 is a cross-sectional view illustrating a portion of a supporting structure disposed between a display and a first plate in a closed state of an electronic device according to an embodiment of the disclosure.

FIG. 13 is a cross-sectional view illustrating a portion of a supporting structure disposed between a display and a first plate in a closed state of an electronic device according to an embodiment of the disclosure.

According to an embodiment, an electronic device 101 may include a first housing 201 (e.g., the first plate 211 and slide cover 212), a second housing 202 (e.g., the second plate 221 and plate cover 222), a display 203, a supporting structure 213, a rib structure 400, a battery 289 (e.g., the first battery 289a or the second battery 289b) and various components (e.g., the rack 287). The configuration of the first housing 201, the second housing 202, the display 203, the supporting structure 213, the battery 289, and the rib structure 400 of FIGS. 12 and 13 may be identical in whole or part to the configuration of the first housing 201, the second housing 202, the display 203, the supporting structure 213, the battery 289, and the rib structure 400 of FIGS. 4, 6A, 6B, and 7.

Referring to FIGS. 12 and 13, when the electronic device 101 switches from the closed state to the opened state, the display 203 may switch from the slide-in to slide-out motion, along with the first plate 211. The supporting structure 213 is disposed between the display 203 and the first plate 211 to support the sliding motion of the display 203. The rib structure 400 coupled with the supporting structure 213 may limit a lift of the display 203 by connecting the first plate 211 and the supporting structure 213 (and display 203).

FIGS. 12 and 13 are cross-sectional views taken along A-A' of FIG. 8A. According to an embodiment, the supporting structure 213 may include a plurality of bars 214, and a rib structure 400 may be disposed on some bars 214 of the plurality of bars 214. For example, the rib structure 400 may include a plurality of ribs 410, and the plurality of ribs 410 may be disposed on the partial areas of some bars 214.

According to an embodiment, the first plate 211 may include a seating recess 2111. The battery 289 may be seated in the seating recess 2111. In the slide-in state of the display 203, the first surface facing the +Z-axis of the battery 289 seated in the seating recess 2111 may face the second plate 221 with the first plate 211 interposed therebetween. In the slide-in state of the display 203, the second surface facing the −Z-axis of the battery 289 seated in the seating recess 2111 may face the display 203 with the supporting structure 213 interposed therebetween. According to an embodiment, as the supporting structure 213 overlapping the battery 289 is formed to be thin, and the second plate 221 overlapping the battery 289 is formed to be thin, the thickness of the battery 289 may be increased.

According to an embodiment, at least some of the bars 214 of the supporting structure 213 may have different thicknesses depending on whether they overlap an electrical component (hereinafter, the battery 289). The at least some bars 214 may include a first area S1 overlapping the battery 289 and a second area S3 not overlapping the battery 289. The thickness of the first area S1 may be smaller than the thickness of the second area S2. By the first area S1 formed to have a thickness smaller than the second area S2, the supporting structure 213 may have a first recess 501 to which at least a portion (e.g., a portion of the battery 289 in the −Z-axis direction) of the battery 289 may be inserted. As compared with a supporting structure without a recess, a supporting structure with a recess may lead to an increase the thickness of the battery 289 in the −Z-axis direction, increasing the capacity of the battery.

According to an embodiment, at least a portion of the second plate 221 may have different thicknesses depending on whether it overlaps the battery 289. At least the portion may include a first portion 2211 overlapping the battery 289 and a second portion 2212 not overlapping the battery 289. The thickness of the first portion 2211 may be smaller than the thickness of the second portion 2212. By the first portion 2211 formed to have a thickness smaller than the second portion 2212, the second plate 221 may have a second recess 502 to which at least a portion (e.g., a portion of the battery 289 in the +Z-axis direction) of the battery 289 and the first plate 211 may be inserted. As compared with a second plate without a recess, the second plate 221 with a recess may lead to an increase the thickness of the battery 289 in the +Z-axis direction, increasing the capacity of the battery.

According to an embodiment, it is possible to increase the capacity of the battery 289 by about 10% by enhancing the thicknesses of the supporting structure 213 and the second plate 221. For example, if the thickness of the first area S1 of the supporting structure 213 is formed to be about 0.2 mm smaller than the thickness of the second area S2, and the thickness of the first portion 2211 of the second plate 221 is formed to be about 0.2 mm smaller than the thickness of the second portion 2212, the thickness of the battery 289 may be further increased by about 0.4 mm.

According to an embodiment, at least some bars 214 of the supporting structure 213 may have different thicknesses depending on whether a rib structure 400 is disposed. The at least some bars 214 may include a first area S1 in which the rib structure 400 is not disposed and a second area S2 in which the rib structure 400 is disposed. As the second area S2 requires a space for at least a portion of the rib structure 400 to be inserted and disposed, the second area S2 may need to be relatively thick as compared with the first area S1.

According to an embodiment, the area in which the rib structure 400 is disposed may be adjacent to an edge of the battery 289. To support the display 203 as a whole and prevent lifting, a plurality of rib structures 400 may be formed. For example, when two batteries (e.g., the first battery 289 and the second battery 289) are disposed to be spaced apart from each other, rib structures 400 may be disposed between the first battery 289 and the second battery 289, in an area adjacent to an end facing above the battery 289 (e.g., the +Y-axis direction), and in an area adjacent to an end facing below the battery 289 (e.g., the −Y-axis direction). In the instant embodiment, two batteries and the rib structures 400 disposed adjacent thereto are described as an example. However, without limitations thereto, various design changes may be made to the arrange of one battery (or three or more batteries) and rib structures 400 adjacent thereto.

Figure 14:
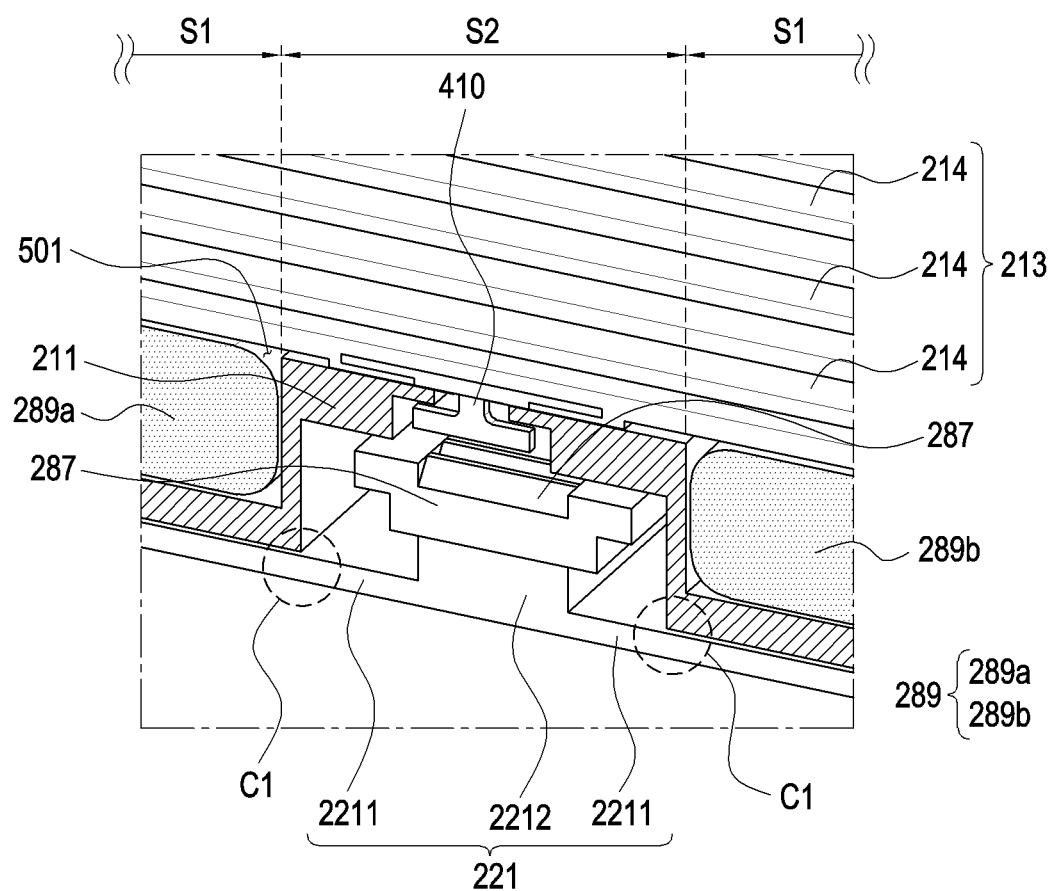
FIG. 14 is a cross-sectional view illustrating a portion of a supporting structure disposed between a display and a first plate in a closed state of an electronic device according to an embodiment of the disclosure.

FIG. 14 is a cross-sectional view illustrating a portion of a supporting structure disposed between a display and a first plate in a closed state of an electronic device according to an embodiment of the disclosure.

According to an embodiment, an electronic device 101 may include a first housing 201 (e.g., the first plate 211), a second housing 202 (e.g., the second plate 221), a display 203, a supporting structure 213, a rib structure 400, a battery 289 (e.g., the first battery 289a or the second battery 289b) and various components (e.g., the rack 287). The configuration of the first housing 201, the second housing 202, the display 203, the supporting structure 213, the battery 289, and the rib structure 400 of FIG. 14 may be identical in whole or part to the configuration of the first housing 201, the second housing 202, the display 203, the supporting structure 213, the battery 289, and the rib structure 400 of FIGS. 11, 12, and 13. The following description focuses primarily on the differences.

FIG. 14 is a cross-sectional view taken along A-A' of FIG. 8A. According to an embodiment, the supporting structure 213 may include a plurality of bars 214, and a rib structure 400 may be disposed on some bars 214 of the plurality of bars 214. For example, the rib structure 400 may include a plurality of ribs, and the plurality of ribs may be disposed on the partial areas of some bars 214.

According to an embodiment, as the thickness of the supporting structure 213 overlapping the battery 289 is formed to be smaller, the thickness of the battery 289 may be increased. According to an embodiment, unlike the configurations of FIGS. 11, 12, and 13, the second plate 221 may be manufactured without a change in thickness.

According to an embodiment, at least some of the bars 214 of the supporting structure 213 may have different thicknesses depending on whether they overlap an electrical component (hereinafter, the battery 289). The at least some bars 214 may include a first area S1 overlapping the battery 289 and a second area S2 not overlapping the battery 289. The thickness of the first area S1 may be smaller than the thickness of the second area S2. By the first area S1 formed to have a thickness smaller than the second area S2, the supporting structure 213 may have a first recess 501 to which at least a portion (e.g., a portion of the battery 289 in the −Z-axis direction) of the battery 289 may be inserted. As compared with a supporting structure without a recess, a supporting structure with a recess may lead to an increase the thickness of the battery 289 in the −Z-axis direction, increasing the capacity of the battery.

According to an embodiment, when a recess shape is formed in a portion of the second plate 221 to increase the thickness of the battery 289 in the +Z-axis direction, friction between the first plate 211 and the second plate 221 may be increased in the circled area C1. The increased friction may hinder the driving force when the first plate 211 slides. According to an embodiment of the disclosure, rather than two opposite surfaces, only one surface of the battery may be designed to be expandable to reduce hindrance to the driving force.

Figure 15:
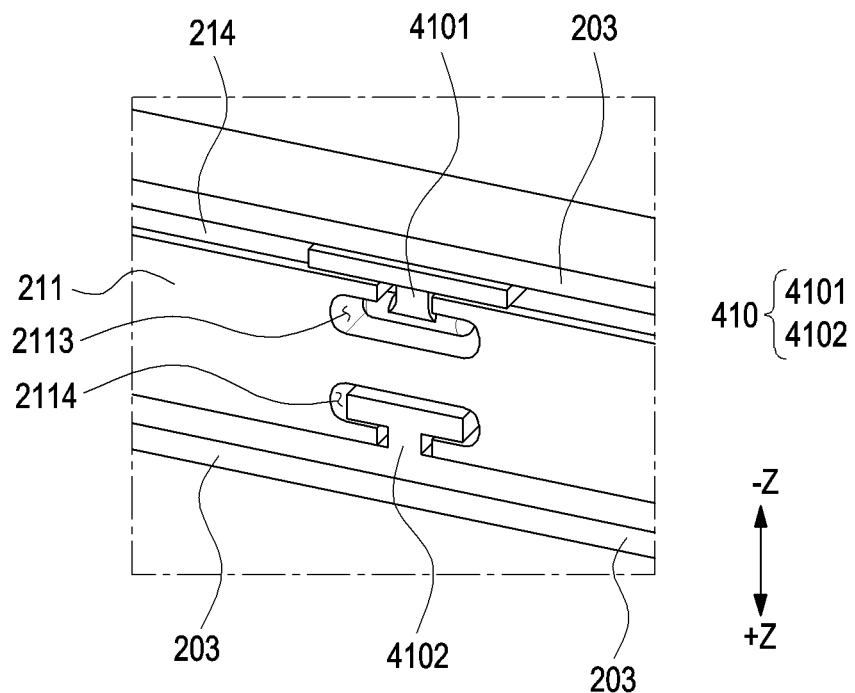
FIG. 15 is a cross-sectional view taken along C-C' of FIG. 8A in an opened state of an electronic device according to an embodiment of the disclosure.

FIG. 15 is a cross-sectional view taken along C-C' of FIG. 8A in an opened state of an electronic device according to an embodiment of the disclosure.

Figure 16:
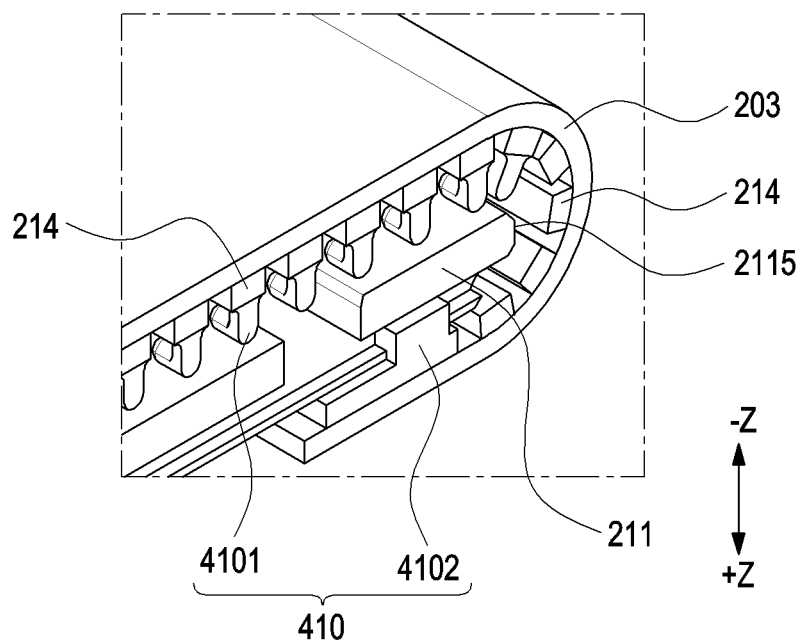
FIG. 16 is a cross-sectional view taken along D-D' of FIG. 8B in an opened state of an electronic device according to an embodiment of the disclosure.

FIG. 16 is a cross-sectional view taken along D-D' of FIG. 8B in an opened state of an electronic device according to an embodiment of the disclosure.

Figure 17A:
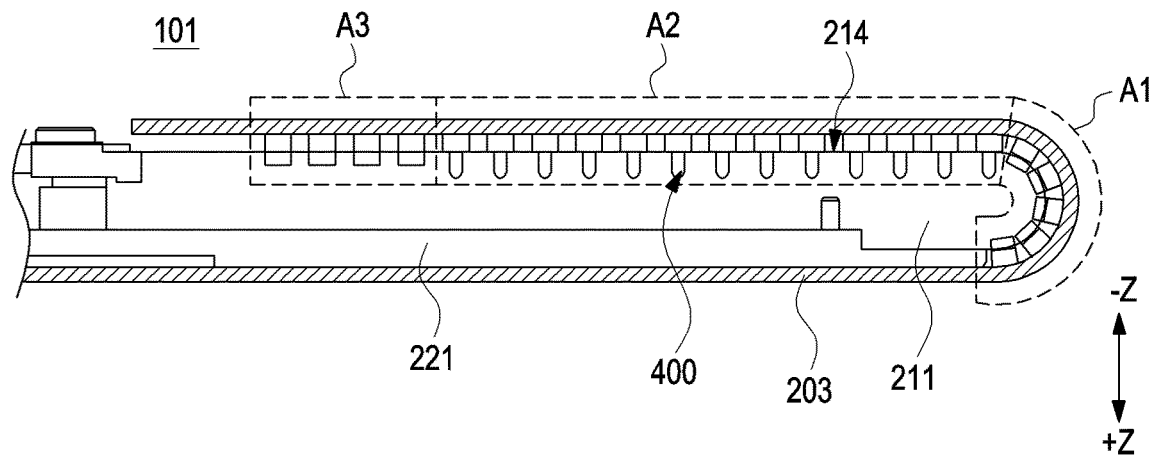
FIG. 17A is a cross-sectional view taken along B-B' of FIG. 8A in a closed state of an electronic device according to an embodiment of the disclosure.

FIG. 17A is a cross-sectional view taken along B-B' of FIG. 8A in a closed state of an electronic device according to an embodiment of the disclosure.

Figure 17B:
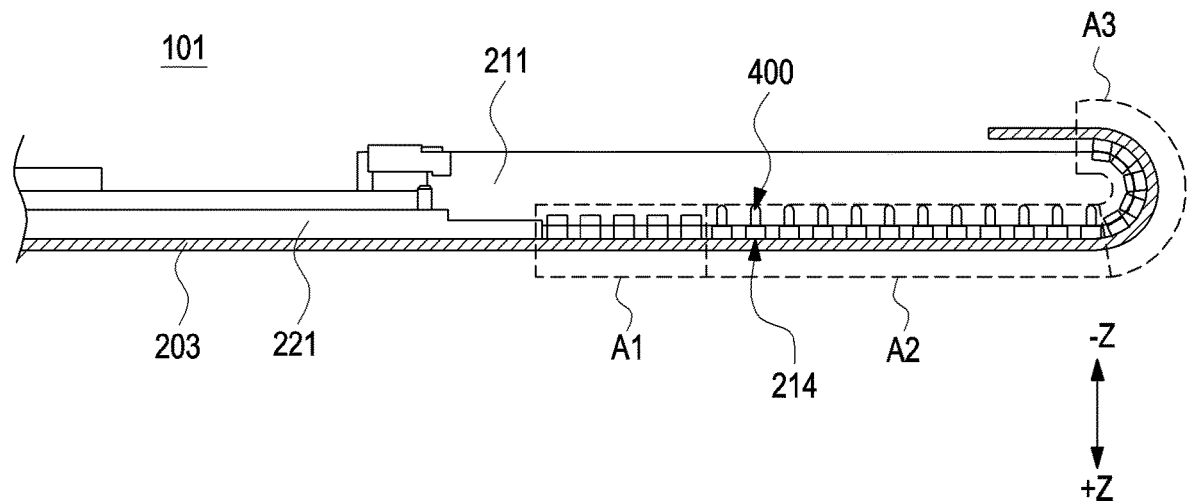
FIG. 17B is a cross-sectional view taken along D-D' of FIG. 8B in a closed state of an electronic device according to an embodiment of the disclosure.

FIG. 17B is a cross-sectional view taken along D-D' of FIG. 8B in a closed state of an electronic device according to an embodiment of the disclosure.

Figure 18A:
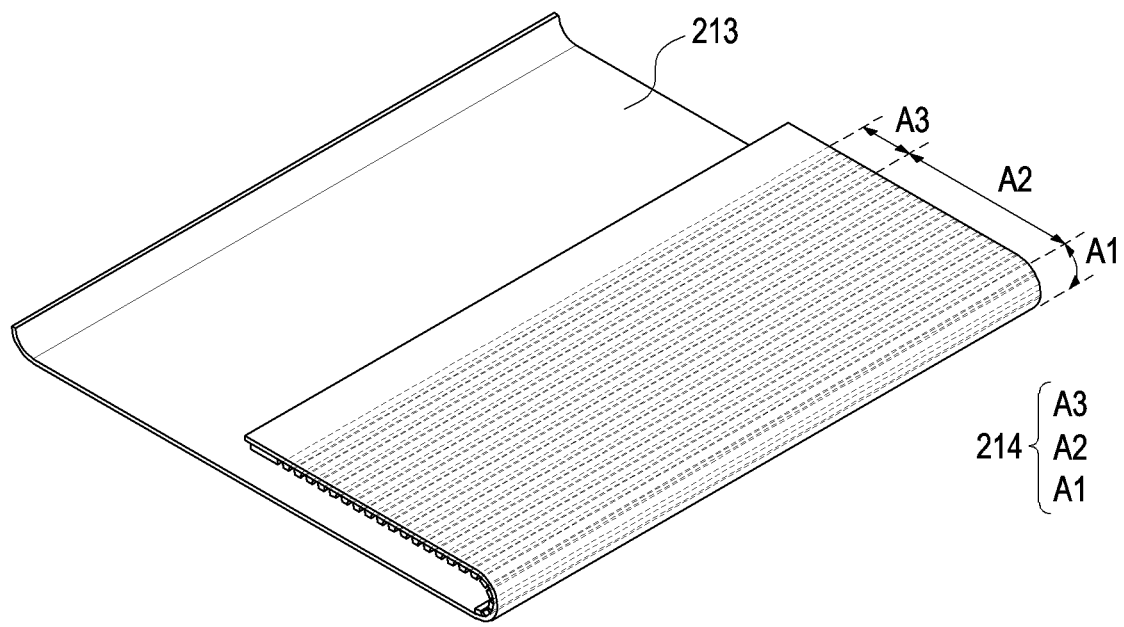
FIG. 18A is a perspective view illustrating only the supporting structure of FIG. 17A according to an embodiment of the disclosure.

FIG. 18A is a perspective view illustrating only the supporting structure of FIG. 17A according to an embodiment of the disclosure.

Figure 18B:
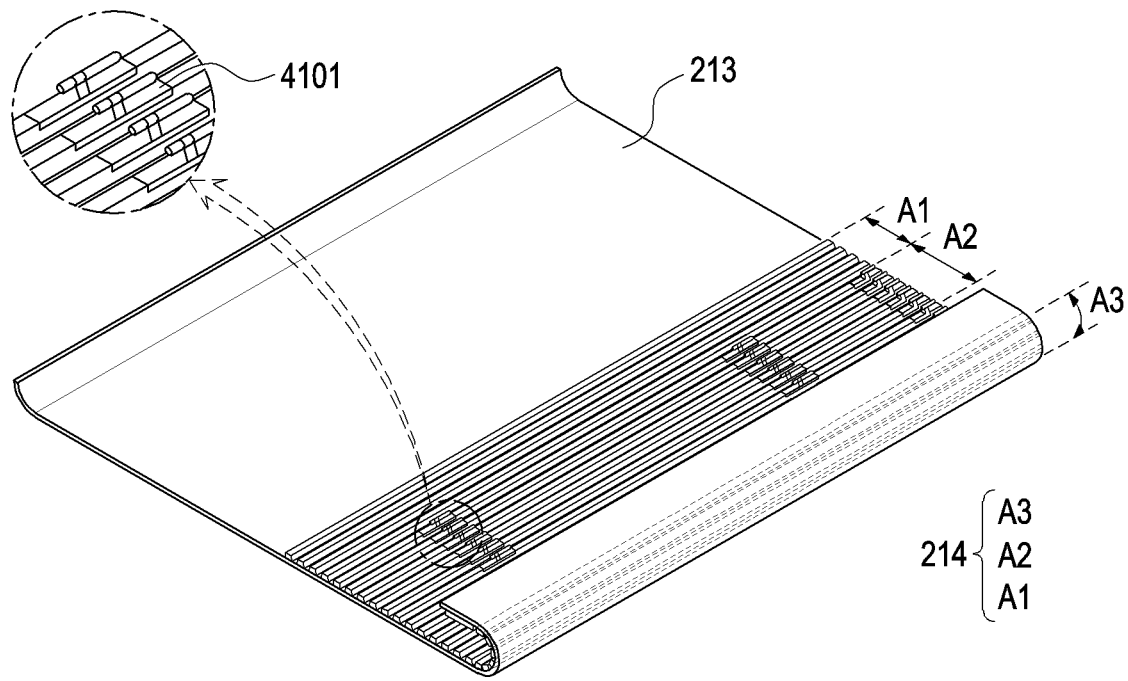
FIG. 18B is a perspective view illustrating only the supporting structure of FIG. 17B according to an embodiment of the disclosure.

FIG. 18B is a perspective view illustrating only the supporting structure of FIG. 17B according to an embodiment of the disclosure.

According to an embodiment, an electronic device 101 may include a first housing 201 (e.g., the first plate 211), a second housing 202 (e.g., the second plate 221), a display 203, a supporting structure 213, and a rib structure 400. The configuration of the first housing 201, the second housing 202, the display 203, the supporting structure 213, and the rib structure 400 of FIGS. 15, 16, 17A, 17B, 18A, and 18B may be identical in whole or part to the configuration of the first housing 201, the second housing 202, the display 203, the supporting structure 213, and the rib structure 400 of FIGS. 4, 5A, 5B, 6A, 6B, 7, 8A, 8B, 9A, 9B, 10, 11A, 11B, 12, 13, and 14.

According to an embodiment, when the electronic device 101 switches from the closed state to the opened state, the display 203 may switch from the slide-in to slide-out motion, along with the first plate 211. The supporting structure 213 is disposed between the display 203 and the first plate 211 to support the sliding motion of the display 203. The rib structure 400 coupled with the supporting structure 213 may limit a lift of the display 203 by connecting the first plate 211 and the supporting structure 213 (and display 203).

According to an embodiment, the supporting structure 213 may include a plurality of bars 214, and a rib structure 400 may be disposed on some bars 214 of the plurality of bars 214. For example, the rib structure 400 may include a plurality of ribs 410, and the plurality of ribs 410 may be disposed on the partial areas of some bars 214.

According to an embodiment, the front surface (e.g., the surface in the +Z-axis direction) and rear surface (e.g., the surface in the −Z-axis direction) of the first plate 211 may include guide recesses 2113 and 2114, respectively, to receive at least a portion of the rib structure 400. The guide recesses 2113 and 2114 may be designed to be slidable while having at least portions (e.g., the stepped portion 412 of FIG. 7) of the ribs 410 of the rib structure 400 received therein.

According to an embodiment, the arrays of the plurality of bars 214 of the supporting structure 213 may include an A1th array A1, an A2th array A2 disposed adjacent to the A1th array A1, and an A3th array A3 disposed adjacent to the A2th array A2. The A1th array A1, the A2th array A2, and the A3th array A3 may be a collection of at least one bar 214.

According to an embodiment, the A1th array A1 is a portion supporting the display area exposed to the outside and the bending area as the display 203 slides in or out and may not have a separate rib 410. The A2th array may support the flat area through the bending area (e.g., flat area→bending area→flat area) as the display 203 slides in or out. The A2th area A2 may have a rib 410 (e.g., guide rib 4101) on each of the plurality of bars 214. The guide ribs 4101 disposed on the A2th array A2 may guide the display 203 to stably slide without lifting from the first plate 211 when the display 203 is bent. According to an embodiment, the A3th array A3 may move only up to the curved portion 2115 of the first plate 211 in the slide-out state of the display 203, without being exposed to the outside, as the display 203 slides in or out. The A3th array A3 supports only the area of the display 203 which is not exposed to the outside after bent and may thus have no separate ribs 410 disposed thereon. According to an embodiment, a rib 410 (hereinafter, supporting rib 4102) may be disposed on at least one bar 214 which is disposed on a portion of the A3th array A3. As the supporting rib 4102 does not support the area where the display 203 is not bent, the supporting rib 4102 may be formed in a relatively large size as compared with the guide ribs 4101 disposed on the A2th array A2. Accordingly, at least one bar 214 of the A3th array A3, as compared with the bars 214 of the A2th array A2, may main a stronger coupling to the first plate 211. However, the bending area and/or whether to expose them to the outside are not the only considerations in machining the plurality of bars 214 of the supporting structure 213, but various design changes may rather be made considering the arrangement of internal structures, such as thickness machining of the area overlapping the internal structure of the electronic device and machining of the rib structure for stable slide and/or convenience in manufacturing process.

Figure 19:
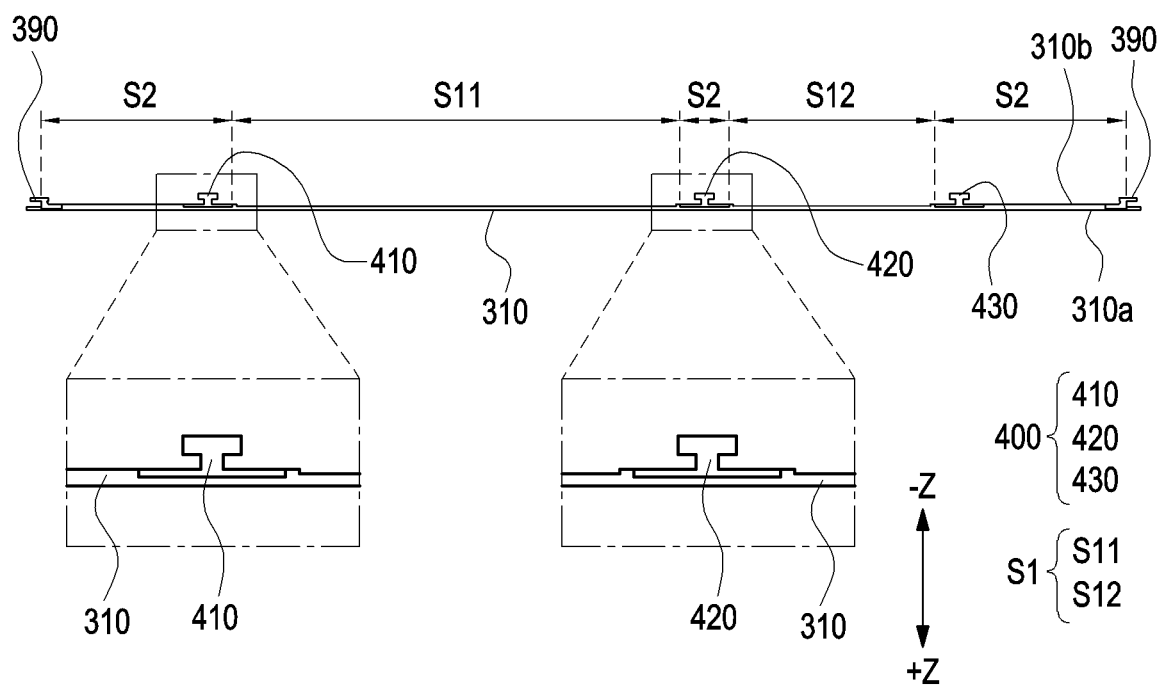
FIG. 19 is a cross-sectional view illustrating a shape of a rib structure and a supporting structure supporting a slide of a display according to an embodiment of the disclosure.

FIG. 19 is a cross-sectional view illustrating a shape of a rib structure and a supporting structure supporting a slide of a display according to an embodiment of the disclosure.

Figure 20:
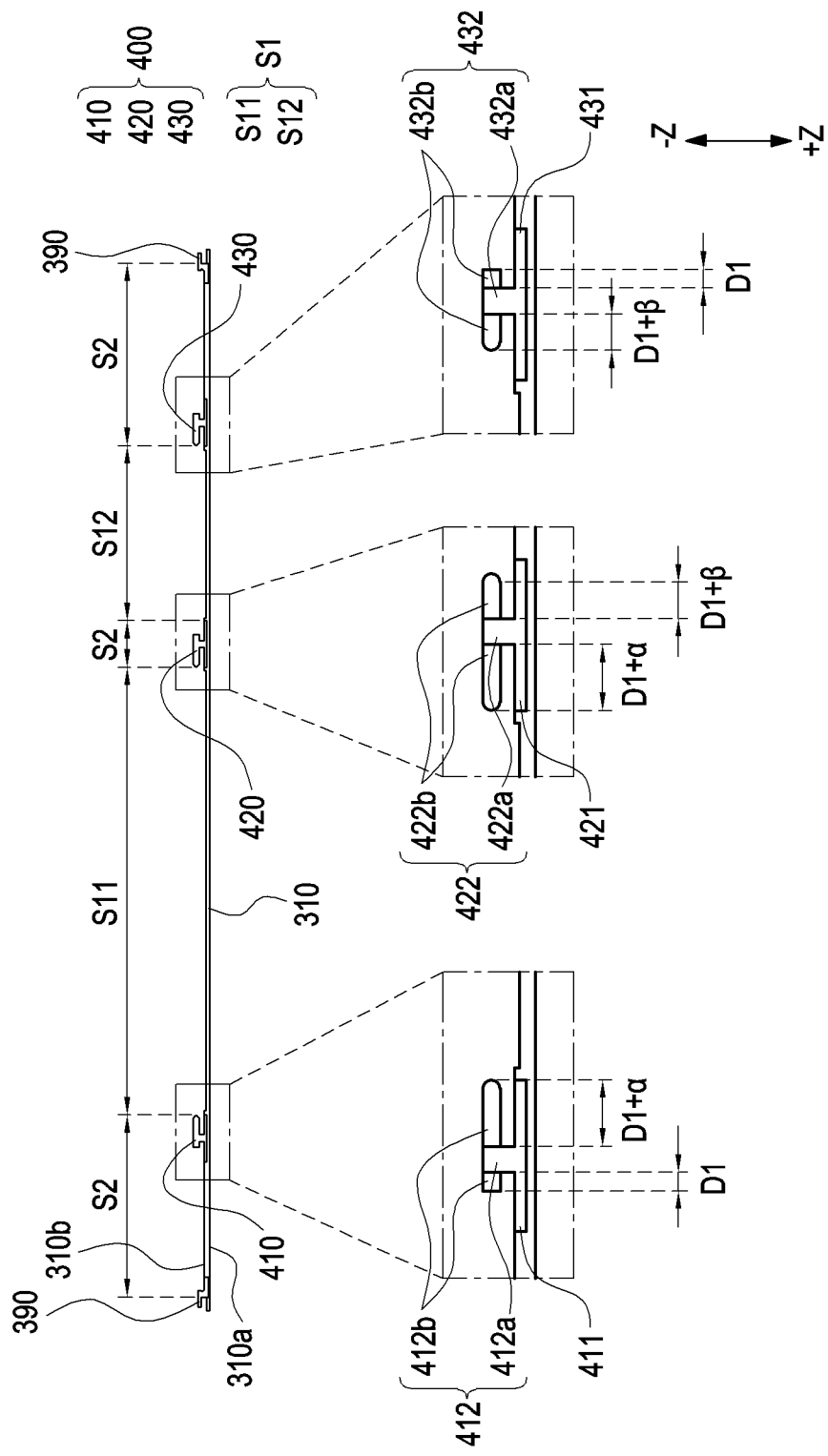
FIG. 20 is a cross-sectional view illustrating another shape of a rib structure and a supporting structure supporting a slide of a display according to an embodiment of the disclosure.

FIG. 20 is a cross-sectional view illustrating another shape of a rib structure and a supporting structure supporting a slide of a display according to an embodiment of the disclosure.

According to an embodiment, an electronic device 101 may include a display (e.g., the display 203 of FIG. 4), a supporting structure 213 supporting the display 203, and a rib structure 400 providing enhanced bending of the display 203. The configuration of the supporting structure 213 and the rib structure 400 of FIGS. 19 and 20 may be identical in whole or part to the configuration of the supporting structure 213 and the rib structure 400 of FIGS. 7, 9, 10A, and 10B.

According to an embodiment, the supporting structure 213 may include a plurality of bars, and a rib structure 400 may be disposed in one area of the plurality of bars. One bar (hereinafter, first bar 310) among the plurality of bars and at least one rib structure (hereinafter, first rib structure 400) disposed on the first bar 310 are described below. The following description may apply to the other bars than the first bar 310 among the plurality of bars and the rib structures disposed thereon.

According to an embodiment, guide ends 390 may be disposed on two opposite ends of the first bar 310. The guide ends 390 may slide along a recess-shaped rail (e.g., the rail 2151 of FIG. 4) formed in the guide rail (e.g., the guide rail 215 of FIG. 4).

According to an embodiment, the display (e.g., the display 203 of FIG. 4) may be disposed over the first surface 310a (e.g., the surface in the +Z-axis direction) of the first bar 310, and the rib structure 400 for connecting with the first plate 211 (e.g., the first plate 211 of FIG. 4) may be disposed on the second surface 310b (e.g., the surface in the −Z-axis direction) opposite to the first surface 310a.

According to an embodiment, the first bar 310 may be formed to have different thicknesses depending on areas.

Referring to FIG. 19, the first bar 310 may include first areas S1 where the plurality of ribs (e.g., the first rib 410, the second rib 420, and the third rib 430) are not disposed and second areas S2 where the plurality of ribs are disposed. The first areas S1 may form a first thickness. The second areas S2 may have a second thickness larger than the first thickness.

According to an embodiment, the first areas S1 are areas positioned between the plurality of ribs (e.g., the first rib 410, the second rib 420, and the third rib 430) and may include a 1-1th area S11 disposed between the first rib 410 and the second rib 420 and a 1-2th area S12 disposed between the second rib 420 and the third rib 430.

According to an embodiment, the 1-1th area S11 may have a first length, and the 1-2th area S12 may have a second length smaller than the first length. For example, the length of the 1-1th area S11 may be about 69 to 75 mm, and the length of the 1-2th area S12 may be about 28 to 32 mm. As another example, the length of the 1-1th area S11 may be about 72 mm, and the length of the 1-2th area S12 may be about 30 mm.

According to an embodiment, the 1-1th area S11 may form a 1-1th thickness, and the 1-2th area S12 may have a 1-2th thickness that is smaller than the 1-1th thickness. For example, the thickness of the 1-1th area S11 may be about 0.65 to 0.75 mm, and the thickness of the 1-2th area S12 may be about 0.55 to 0.65 mm. As another example, the thickness of the 1-1th area S11 may be about 0.7 mm, and the thickness of the 1-2th area S12 may be about 0.6 mm.

As the 1-1th area S11 and the 1-2th area S12 have different inter-rib spacings, a difference in lift of the display 203 may occur. According to an embodiment, the 1-1th area S11 which is relatively long as compared with the 1-2th area S12 is formed to be thicker, thereby preventing a difference in the lift of the display 203 between the 1-1th area S11 and the 1-2th area S12.

According to an embodiment, the first bar 310 may be formed to have different thicknesses depending on areas and, in an area formed with the same thickness, the ribs may be designed in different shapes depending on the spacing between the ribs.

Referring to FIG. 20, the first bar 310 may include first areas S1 where the plurality of ribs (e.g., the first rib 410, the second rib 420, and the third rib 430) are not disposed and second areas S2 where the plurality of ribs 410 are disposed. The first areas S1 may form a first thickness. The second areas S2 may have a second thickness smaller than the first thickness.

According to an embodiment, the first areas S1 are areas positioned between the plurality of ribs 410, and may include a 1-1th area S11 disposed between the first rib 410 and the second rib 420 and a 1-2th area S12 disposed between the second rib 420 and the third rib 430. The thicknesses of the 1-1th area S11 and the 1-2th area S12 may be the same as each other.

According to an embodiment, the first rib 410 may be positioned between the guide ends 390 disposed on two opposite ends of the first bar 310 and may include a first fixing portion 411 to be fixed to the first bar 310 and a first stepped portion 412 extending from the first fixing portion 411 to the first plate 211. The first fixing portion 411 may be positioned in a recess formed in an area of the first bar 310. The first stepped portion 412 may include a first portion 412a connected to the first fixing portion 411 and a second portion 412b extending in two opposite directions perpendicular to the first portion 412a. For example, the second portion 412b may extend parallel to the first fixing portion 411 along the slide direction.

According to an embodiment, the second area S2 in which the first rib 410 is positioned may be designed to have a larger thickness than the 1-1th area S11. One end portion of the first rib 410 toward a thinner area (e.g., the 1-1th area S11) from the center of the first rib 410 may be longer as compared with the other end portion facing opposite to the one end. For example, when the one end of the first rib 410 has a length of D1+α, the other end of the first rib 410 may have a length of D1. As the first rib 410 designed to have different lengths at two opposite ends thereof maintains the spacing between the first plate 211 and the display 203 constant even when the first bar 310 has different thicknesses in areas, the lift of the display 203 during the slide-in/out motion of the display 203 may be limited.

According to an embodiment, the second rib 420 may be positioned between the guide ends 390 disposed on two opposite ends of the first bar 310 and may include a second fixing portion 421 to be fixed to the first bar 310 and a second stepped portion 422 extending from the second fixing portion 421 to the first plate 211. The second fixing portion 421 may be positioned in a recess formed in an area of the first bar 310. The second stepped portion 422 may include a 2-1th portion 422a connected to the second fixing portion 421 and a 2-2th portion 422b extending in two opposite directions perpendicular to the 2-1th portion 422a. For example, the 2-2th portion 422b may extend parallel to the second fixing portion 421 along the slide direction.

According to an embodiment, the second area S2 in which the second rib 420 is positioned may be positioned between the 1-1th area S11 and the 1-2th area S12, and be designed to have a larger thickness than the 1-1th area S11 and 1-2th area S12. The 1-1th area S11 has the same thickness as the 1-2th area S12 but may be formed to be relatively longer than the 1-2th area S12, so that the force holding the display 203 may be weak. One end portion of the second rib 420 facing the 1-1th area S11 from the center of the second rib 420 may be longer as compared with the other end portion facing opposite (e.g., toward the 1-2th area S12) to the one end portion. For example, when the one end of the second rib 420 has a length of D1+α, the other end thereof may have a length of D1+β(β<α). As the second rib 420 designed to have different lengths at two opposite ends thereof maintains the spacing between the first plate 211 and the display 203 constant even when the areas supported by the second bar 320 have different lengths, the lift of the display 203 during the slide-in/out motion of the display 203 may be limited.

According to an embodiment, the third rib 430 may be positioned between the guide ends 390 disposed on two opposite ends of the first bar 310 and may include a third fixing portion 431 to be fixed to the third bar 310 and a third stepped portion 432 extending from the third fixing portion 431 to the first plate 211. The third fixing portion 431 may be positioned in a recess formed in an area of the first bar 310. The third stepped portion 432 may include a 3-1th portion 432a connected to the third fixing portion 431 and a 3-2th portion 432b extending in two opposite directions perpendicular to the 3-1th portion 432a. For example, the 3-2th portion 432b may extend parallel to the third fixing portion 431 along the slide direction.

According to an embodiment, the second area S2 in which the third rib 430 is positioned may be designed to have a larger thickness than the 1-2th area S12. One end portion of the third rib 430 toward a thinner area (e.g., the 1-2th area S12) from the center of the third rib 430 may be longer as compared with the other end portion facing opposite to the one end. For example, when the one end of the third rib 430 has a length of D1+β, the other end thereof may have a length of D1. As the third rib 430 designed to have different lengths at two opposite ends thereof maintains the spacing between the first plate 211 and the display 203 constant even when the third bar 330 has different thicknesses in areas, the lift of the display 203 during the slide-in/out motion of the display 203 may be limited.

Figure 21A:
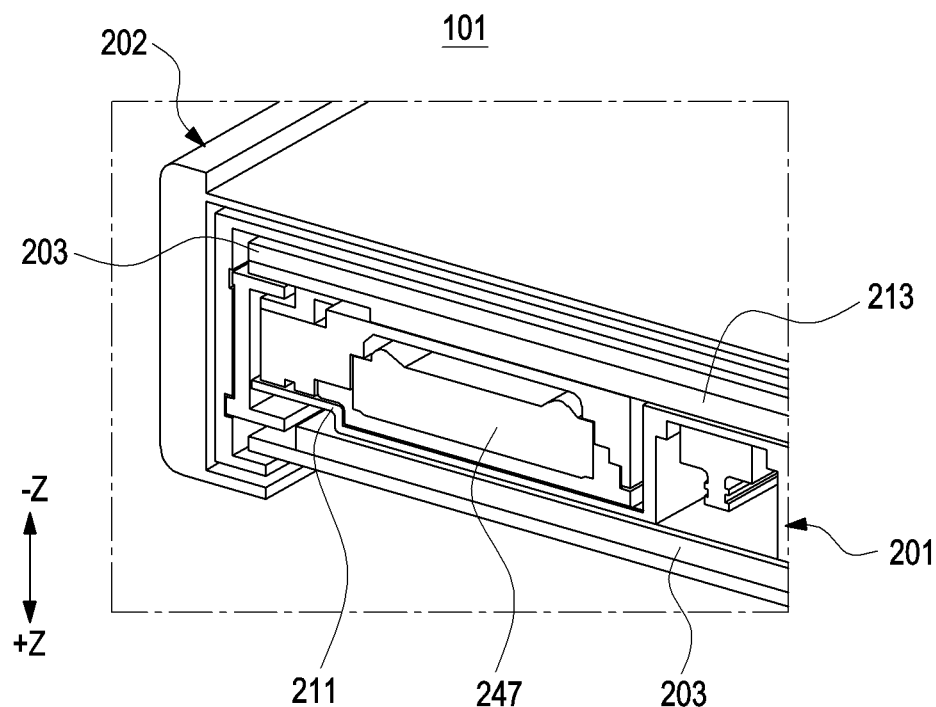
FIG. 21A is a cross-sectional view illustrating a speaker module disposed in a middle of a display in a closed state of an electronic device according to an embodiment of the disclosure.

FIG. 21A is a cross-sectional view illustrating a speaker module disposed in a middle of a display in a closed state of an electronic device according to an embodiment of the disclosure.

Figure 21B:
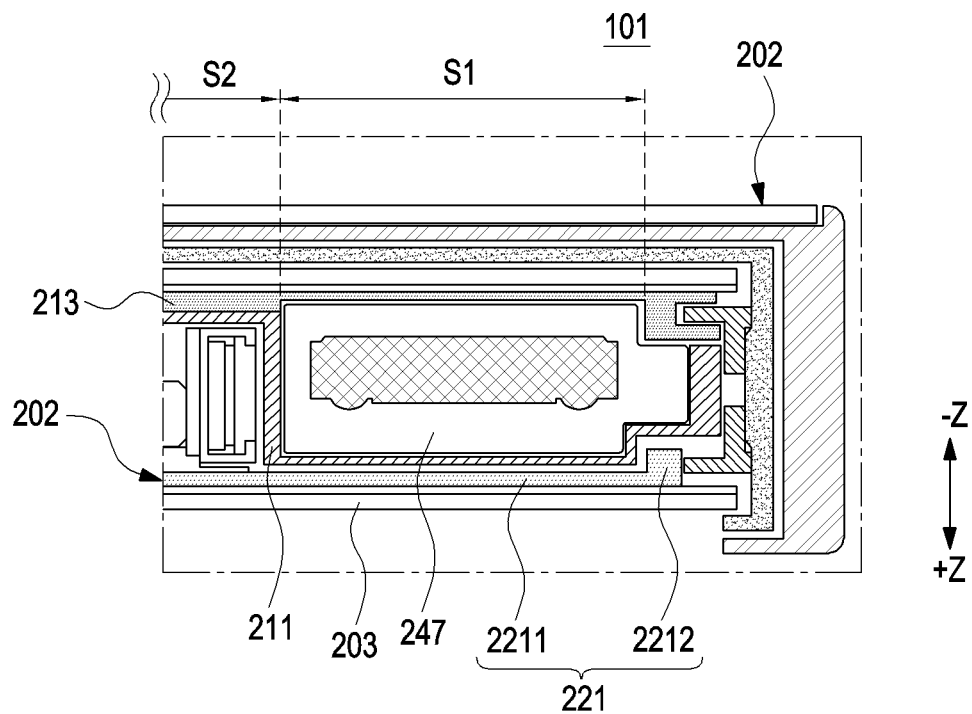
FIG. 21B is a perspective view illustrating a cross section of a portion of a speaker module disposed in a middle of a display in a closed state of an electronic device according to an embodiment of the disclosure.

FIG. 21B is a perspective view illustrating a cross section of a portion of a speaker module disposed in a middle of a display in a closed state of an electronic device according to an embodiment of the disclosure.

According to an embodiment, an electronic device 101 may include a first housing 201 (e.g., the first plate 211), a second housing 202 (e.g., the second plate 221), a display 203, a supporting structure 213, a rib structure 400, and a speaker module 247. The configuration of the first housing 201, the second housing 202, the display 203, the supporting structure 213, and the speaker module 247 of FIGS. 21A and 21B may be identical in whole or part to the configuration of the first housing 201, the second housing 202, the display 203, the supporting structure 213, the battery 289, and the speaker module 247 of FIGS. 4, 5A, 5B, 6A, 6B, 7, 8A, 8B, 9A, 9B, 10, 11A, 11B, 12, 13, 14, 15, 16, 17A, 17B, 18A, 18B, 19, and 20.

Referring to FIGS. 21A and 21B, when the electronic device 101 switches from the closed state to the opened state, the display 203 may switch from the slide-in to slide-out motion, along with the first plate 211. The supporting structure 213 is disposed between the display 203 and the first plate 211 to support the sliding motion of the display 203.

FIGS. 21A and 21B are cross-sectional views taken along P-P' of FIG. 5A. According to an embodiment, the speaker module 247 may be seated inside the first plate 211. In the slide-in state of the display 203, the first surface facing the +Z-axis of the speaker module 247 may face the second plate 221 with the first plate 211 interposed therebetween. In the slide-in state of the display 203, the second surface facing the −Z-axis of the speaker module 247 may face the display 203 with the supporting structure 213 interposed therebetween. According to an embodiment, as the supporting structure 213 overlapping the speaker module 247 is formed to be thin, and the second plate 221 overlapping the speaker module 247 is formed to be thin, the thickness of the speaker module 247 may be increased.

According to an embodiment, at least a portion (e.g., at least some bars 214) of the supporting structure 213 may have different thicknesses depending on whether they overlap an electrical component (hereinafter, the speaker module 247). The supporting structure 213 may include a first area S1 overlapping the speaker module 247 and a second area S2 not overlapping the speaker module 247. The thickness of the first area S1 may be smaller than the thickness of the second area S2. By the first area S1 formed to have a thickness smaller than the second area S2, the supporting structure 213 may have a recess shape to which at least a portion (e.g., a portion of the speaker module 247 in the −Z-axis direction) of the speaker module 247 is inserted. As compared with a supporting structure without a recess shape, a supporting structure with a recess shape may increase the thickness of the speaker module 247 in the −Z-axis direction, enhancing the size and resultant performance of the speaker module 247.

According to an embodiment, at least a portion of the second plate 221 may have different thicknesses depending on whether it overlaps the speaker module 247. At least the portion may include a first portion 2211 overlapping the speaker module 247 and a second portion 2212 not overlapping the speaker module 247. The thickness of the first portion 2211 may be smaller than the thickness of the second portion 2212. By the first portion 2211 formed to have a thickness smaller than the second portion 2212, the second plate 221 may have a recess shape to which at least a portion (e.g., a portion of the speaker module 247 in the +Z-axis direction) of the speaker module 247 and the first plate 211 may be inserted. As compared with a second plate without a recess shape, the second plate 221 with a recess shape may increase the thickness of the speaker module 247 in the +Z-axis direction, enhancing the size and resultant performance of the speaker module 247.

According to an embodiment, it is possible to increase the volume of the speaker module 247 by about 0.1 cc by enhancing the thicknesses of the supporting structure 213 and the second plate 221. For example, if the thickness of the first area S1 of the supporting structure 213 is formed to be about 0.2 mm smaller than the thickness of the second area S2, and the thickness of the first portion 2211 of the second plate 221 is formed to be about 0.2 mm smaller than the thickness of the second portion 2212, the thickness of the speaker module 247 may be further increased by about 0.4 mm.

Figure 22A:
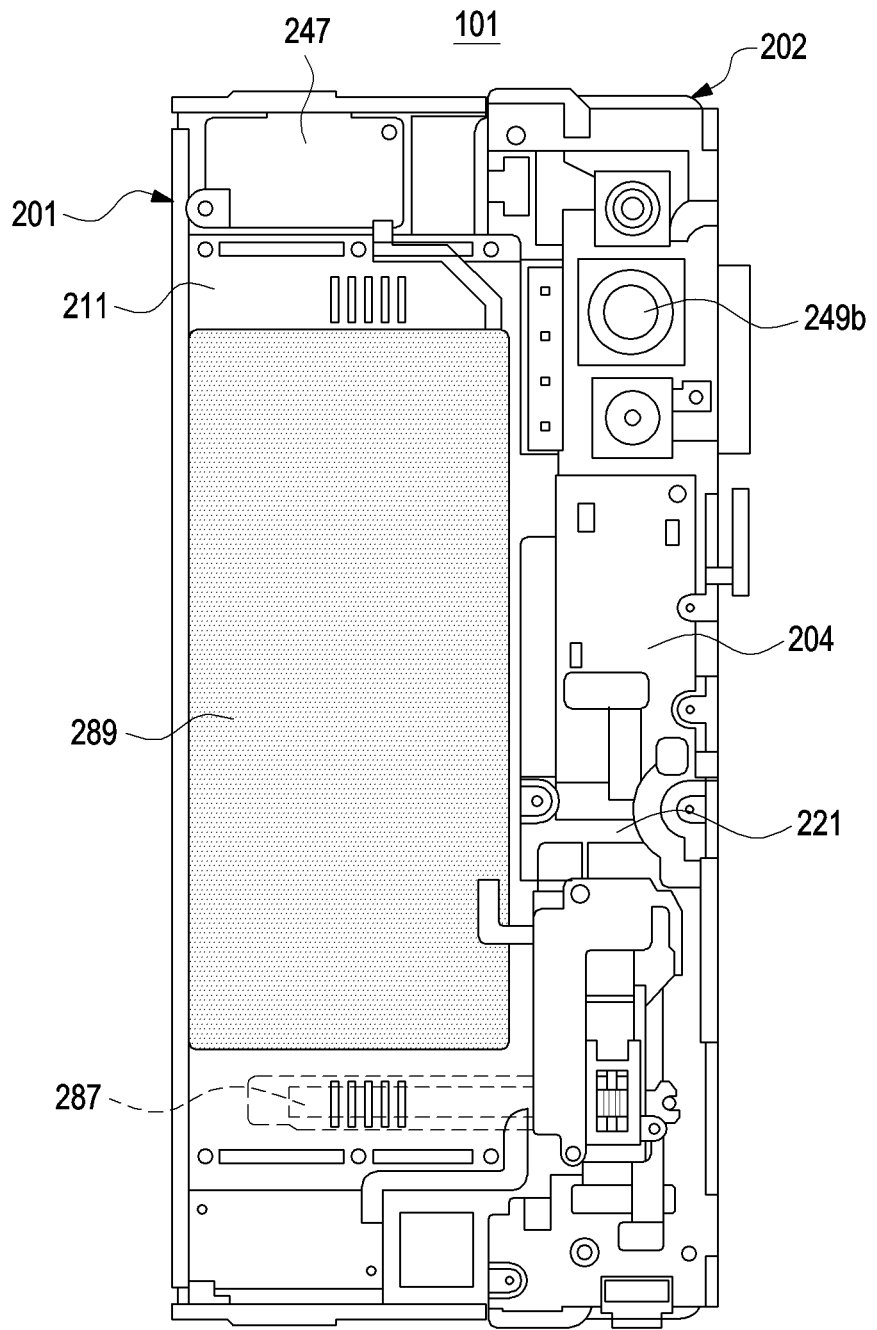
FIG. 22A is a view illustrating electrical components in an electronic device in a closed state of the electronic device according to an embodiment of the disclosure.

FIG. 22A is a view illustrating electrical components in an electronic device in a closed state of the electronic device according to an embodiment of the disclosure.

Figure 22B:
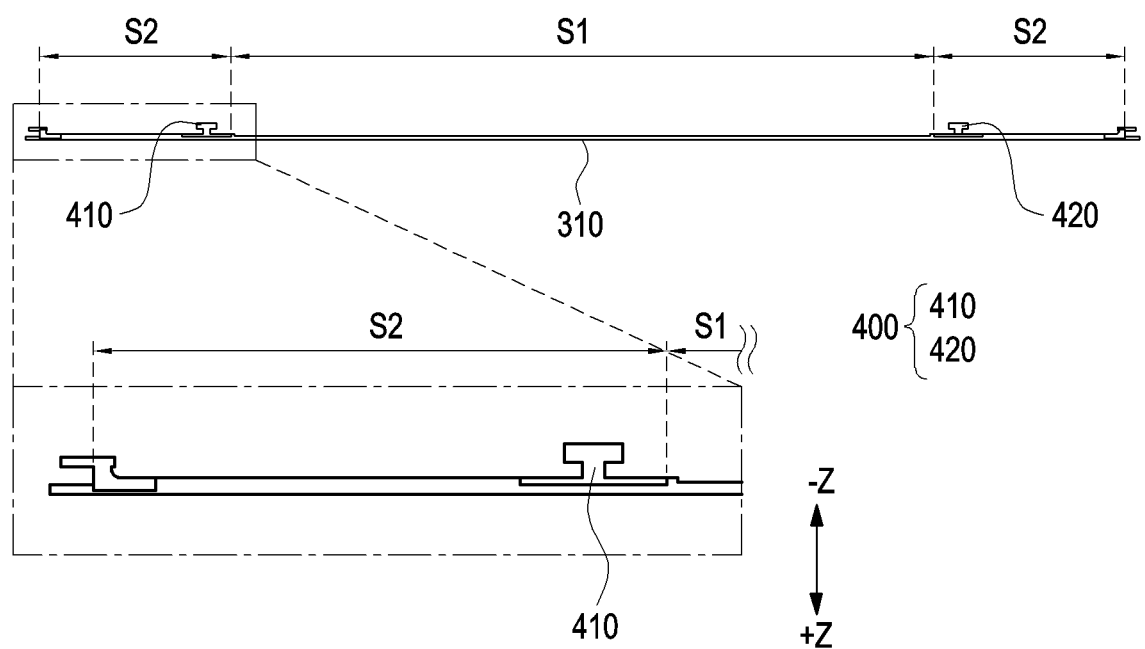
FIG. 22B is a view illustrating one bar shape of a supporting structure disposed in the electronic device of FIG. 22A according to an embodiment of the disclosure.

FIG. 22B is a view illustrating one bar shape of a supporting structure disposed in the electronic device of FIG. 22A according to an embodiment of the disclosure.

According to an embodiment, an electronic device 101 may include a first housing 201 (e.g., the first plate 211), a second housing 202 (e.g., the second plate 221), a supporting structure 213, a battery 289, and various components (e.g., the camera module 249a, speaker 247, and rack 287). The configuration of the first housing 201, the second housing 202, the supporting structure 213, and the battery 289 of FIGS. 22A and 22B may be identical in whole or part to the configuration of the first housing 201, the second housing 202, the display 203, the supporting structure 213, and the battery 289 of FIGS. 4, 5A, 5B, 6A, 6B, 7, 8A, 8B, 9A, 9B, 10, 11A, 11B, 12, 13, 14, 15, 16, 17A, 17B, 18A, 18B, 19, and 20.

According to an embodiment, as the display 203 slides, at least some of the plurality of bars of the supporting structure 213 may orbit around the battery 289. For example, in the slide-in state of the display 203, the plurality of bars may be disposed to be spaced apart from each other along the side surface of the battery 289 from one surface (e.g., rear surface) facing in the −Z-axis direction of the battery 289. In the slide-out state of the display 203, the plurality of bars may slide and be thus disposed to be spaced apart along the side surface of the battery 289 from one surface (e.g., front surface) facing in the +Z-axis direction of the battery 289.

According to an embodiment, in a configuration related to the battery 289 manufactured as a one pack, the rib structure 400 is disposed only in an area that does not overlap the battery 289, thereby enhancing the mounting space of the battery 289.

According to an embodiment, a rib structure 400 may be disposed in at least a partial area of the plurality of bars of the supporting structure 213 to limit the lift of the display 203 due to the slide-in/out motion of the display 203. One bar (hereinafter, the first bar 310) among the plurality of bars and at least one rib structure 400 disposed on the first bar 310 are described below. The following description may apply to the other bars than the first bar 310 among the plurality of bars 214 and the rib structures disposed thereon.

According to an embodiment, the first bar 310 may be formed to have different thicknesses depending on areas. Referring to FIG. 22B, the first bar 310 may include first areas S1 where the plurality of ribs (e.g., the first rib 410 and the second rib 420) are not disposed and second areas S2 where the plurality of ribs 410 are disposed. The first areas S1 may form a first thickness. The second areas S2 may have a second thickness larger than the first thickness. For example, the thickness of the first areas S1 may be about 0.55 mm to 0.65 mm. The thickness of the second areas S2 may be about 0.75 to 0.85 mm. As another example, the thickness of the first areas S1 may be about 0.6 mm. The thickness of the second areas S2 may be about 0.8 mm.

According to an embodiment, to optimize the mounting space, e.g., to increase the mounting space of an electrical component, such as a battery, the first bar 310 may need to be reduced in thickness in the area overlapping the battery. Thus, the first areas S1 overlapping the battery may be implemented to be set to have a minimum thickness to support the display 203. As the supporting structure 213 slides while substantially surrounding the front and rear surfaces of the battery 289, if the thickness of the first bar 310 is reduced, the capacity of the battery 289 may be utilized in twice as large a space as the reduction in thickness of the first bar 310.

According to an embodiment of the disclosure, an electronic device (e.g., the electronic device 101 of FIGS. 1 to 4) may comprise a first housing (e.g., 201 of FIGS. 2 to 4), a second housing (e.g., 202 of FIGS. 2 to 4), the first housing slidable with respect to the second housing, a flexible display (e.g., 203 of FIG. 4) including a first display area and a second display area extending from the first display area and bendable or rollable, a battery (e.g., 289 of FIG. 4) disposed in an area of the first housing or the second housing, and a supporting structure (e.g., 213 of FIG. 4) supporting at least a portion of the flexible display. The supporting structure may include a first area (e.g., S1 of FIG. 13) overlapping the battery and a second area (e.g., S2 of FIG. 13) extending from the first area. The first area of the supporting structure may have a first thickness, and the second area of the supporting structure may have a second thickness larger than the first thickness.

According to an embodiment, the electronic device may further comprise a rib structure (e.g., 400 of FIG. 12)

disposed in the second area of the supporting structure and sliding in response to the slide of the first housing.

According to an embodiment, the electronic device may further comprise a rib structure (e.g., 400 of FIG. 12) including a fixing portion (e.g., 411 of FIG. 7) coupled with a portion of the supporting structure and a stepped portion (e.g., 412 of FIG. 7) extending from the fixing portion to the first housing.

According to an embodiment, the stepped portion of the rib structure may be slidable in a state inserted in a recess formed in the first housing.

According to an embodiment, the stepped portion of the rib structure may include a first portion (e.g., 412*a* of FIG. 7) connected with the fixing portion and a second portion (e.g., 412*b* of FIG. 7) extending in two opposite directions from the first portion. The extending direction of the second portion may be perpendicular to a slide direction of the first housing.

According to an embodiment, the supporting structure may include a plurality of bars (e.g., 214 of FIG. 6A). The plurality of bars may be transformed in response to the bending or rolling of the flexible display.

According to an embodiment, at least some of the plurality of bars may be formed to have a different thickness depending on an area.

According to an embodiment, the plurality of bars may include a first bar and a second bar parallel to the first bar. The first bar may include the first area and the second area. No rib may be disposed in the first area, and the rib may be disposed in the second area.

According to an embodiment, the second bar may be formed to overall have a same thickness as the first area of the first bar.

According to an embodiment, the rib structure may be disposed between guide ends disposed on two opposite ends of the first bar.

According to an embodiment, the rib structure may comprise a fixing portion configured to be fixed to the bar and a stepped portion extending from the fixing portion.

According to an embodiment, the electronic device may further comprise a rib structure disposed in an area of the supporting structure. The rib structure may include arrays of a plurality of ribs. The arrays of the plurality of ribs may include a first array (e.g., 401 of FIG. 6A) formed of ribs arranged along a sliding direction of the first housing and a second array (e.g., 402 and 403 of FIG. 6A) formed of ribs arranged parallel to the first array.

According to an embodiment, in a closed state of the electronic device, the supporting structure may include a first recess (e.g., 501 of FIG. 12) formed due to a difference in thickness between the first area and the second area, and a portion of the battery facing the flexible display may be inserted in the first recess 501.

According to an embodiment, at least a portion of the second housing may include a first portion overlapping the battery and a second portion extending from the first portion. The first portion (e.g., 2211 of FIG. 12) of the second housing may have a third thickness, and the second portion (e.g., 2212 of FIG. 12) of the second housing may have a fourth thickness larger than the third thickness.

According to an embodiment, in the closed state of the electronic device, the second housing may include a second recess 502 formed due to a difference in thickness between the first portion and the second portion, and a portion of the battery facing in a direction opposite to the flexible display may be inserted in the second recess 502.

According to an embodiment, the electronic device may further comprise a rib structure fixed to a portion of the supporting structure and including a plurality of ribs. A first rib and a second rib among the plurality of ribs may be disposed to be spaced apart from each other, with the battery disposed therebetween.

According to an embodiment, the electronic device may further comprise a rib structure fixed to a portion of the supporting structure and including a plurality of ribs. The battery may include a first battery and a second battery disposed to be spaced apart from each other. A first rib and a second rib among the plurality of ribs may be disposed with the first battery disposed therebetween, and the second rib and a third rib among the plurality of ribs may be disposed with the second battery disposed therebetween.

According to an embodiment, in a slide-in state of the flexible display, the second display area may include a 2-1th area formed to be bent and a 2-2th area formed to be flat and extending from the 2-1th area. The supporting structure may include a plurality of arrays constituted of a collection of a plurality of bars, and the plurality of arrays may include an A1th array and an A2th array arranged parallel to the A1th array. Bars of the A1th array may support the 2-1th area and have no ribs disposed therein, and bars of the A2th array may support the 2-2th area and have the ribs disposed therein.

According to an embodiment, the battery may be disposed in the first housing and slide in response to the slide.

According to an embodiment, the supporting structure may comprise an inflexible plate area disposed to correspond to the first display area.

According to an embodiment, the electronic device may comprise a rack disposed in the second housing and configured to guide sliding of the first housing and the flexible display.

According to an embodiment of the disclosure, an electronic device (e.g., the electronic device 101 of FIGS. 1 to 4) may comprise a first housing (e.g., 201 of FIGS. 2 to 4), a second housing (e.g., 202 of FIGS. 2 to 4) receiving at least a portion of the first housing, the first housing slidable with respect to the second housing, a flexible display (e.g., 203 of FIG. 4) including a first display area and a second display area extending from the first display area and bendable or rollable, a supporting structure (e.g., 213 of FIG. 4) supporting at least a portion of the flexible display, and a rib structure (e.g., 400 of FIG. 12) including a fixing portion (e.g., 411 of FIG. 7) coupled with a portion of the supporting structure and a stepped portion (e.g., 412 of FIG. 7) extending from the fixing portion and coupled to the first housing.

According to an embodiment, the electronic device may further comprise an electrical component disposed in an area of the first housing or the second housing. The supporting structure may include a first area overlapping the electrical component and a second area extending from the first area and having the rib structure disposed therein. The first area of the supporting structure may have a first thickness, and the second area of the supporting structure has a second thickness larger than the first thickness.

According to an embodiment, the electrical component may be at least one of a battery and a speaker module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing, the first housing being slidable with respect to the second housing;
   a flexible display including a first display area and a second display area extending from the first display area, the second display area being bent or rolled in response to the first housing moving with respect to the second housing;
   a battery disposed in the first housing or the second housing; and
   a supporting structure supporting at least a portion of the flexible display,
   wherein the supporting structure includes a first area overlapping the battery and a second area without overlapping the battery,
   wherein the first area of the supporting structure has a first thickness,
   wherein the second area of the supporting structure has a second thickness larger than the first thickness,
   wherein the supporting structure includes a plurality of bars, and
   wherein the supporting structure is configured to bend or roll together with the flexible display in response to the first housing moving with respect to the second housing.

2. The electronic device of claim 1, further comprising:
   a rib structure disposed in the second area of the supporting structure and sliding in response to a sliding of the first housing.

3. The electronic device of claim 1, further comprising:
   a rib structure including:
      a fixing portion coupled with a portion of the supporting structure; and
      a stepped portion extending from the fixing portion to the first housing.

4. The electronic device of claim 3, wherein the stepped portion of the rib structure is slidable in a state inserted in a recess formed in the first housing.

5. The electronic device of claim 3,
   wherein the stepped portion of the rib structure includes a first portion connected with the fixing portion and a second portion extending in two opposite directions from the first portion, and
   wherein an extending direction of the second portion is perpendicular to a slide direction of the first housing.

6. The electronic device of claim 1, wherein at least some of the plurality of bars have a different thickness depending on a location.

7. The electronic device of claim 1,
   wherein the plurality of bars include a first bar and a second bar parallel to the first bar,
   wherein the first bar includes the first area and the second area, and
   wherein the first area is devoid of ribs, and a rib is disposed in the second area.

8. The electronic device of claim 7, wherein the second bar is formed to have a same thickness overall as the first area of the first bar.

9. The electronic device of claim 1, further comprising:
   a rib structure disposed in an area of the supporting structure,
   wherein the rib structure includes arrays of a plurality of ribs, and
   wherein the arrays of the plurality of ribs include a first array comprising ribs arranged along a sliding direction of the first housing and a second array comprising ribs arranged parallel to the first array.

10. The electronic device of claim 1, wherein in a closed state of the electronic device:
    the supporting structure includes a first recess configured as a difference in thickness between the first area and the second area, and
    a portion of the battery facing the flexible display is inserted in the first recess.

11. The electronic device of claim 10,
    wherein at least a portion of the second housing includes a first portion overlapping the battery and a second portion extending from the first portion,
    wherein the first portion of the second housing has a third thickness, and
    wherein the second portion of the second housing has a fourth thickness greater than the third thickness.

12. The electronic device of claim 11, wherein in the closed state of the electronic device:
    the second housing includes a second recess configured as a difference in thickness between the first portion and the second portion; and
    a portion of the battery facing in a direction opposite to the flexible display is inserted in the second recess.

13. The electronic device of claim 1, further comprising:
    a rib structure fixed to a portion of the supporting structure and including a plurality of ribs,
    wherein a first rib and a second rib among the plurality of ribs are disposed to be spaced apart from each other, with the battery disposed therebetween.

14. The electronic device of claim 1, further comprising:
    a rib structure fixed to a portion of the supporting structure and including a plurality of ribs,
    wherein the battery includes a first battery and a second battery disposed to be spaced apart from each other,
    wherein a first rib and a second rib among the plurality of ribs are disposed with the first battery disposed therebetween, and
    wherein the second rib and a third rib among the plurality of ribs are disposed with the second battery disposed therebetween.

15. The electronic device of claim 1,
    wherein in a slide-in state of the flexible display, the second display area includes a 2-1th area formed to be bent and a 2-2th area formed to be flat and extending from the 2-1th area,
    wherein the supporting structure includes a plurality of arrays each comprising a plurality of bars,
    wherein the plurality of arrays include an A1th array and an A2th array arranged parallel to the A1th array,
    wherein bars of the A1th array support the 2-1th area and are devoid of ribs, and
    wherein bars of the A2th array support the 2-2th area and have ribs disposed therein.

16. The electronic device of claim 1, wherein the battery is disposed in the first housing and slides in response to a sliding of the first housing.

17. An electronic device comprising:
    a first housing;
    a second housing receiving at least a portion of the first housing, the first housing being slidable with respect to the second housing;
    a flexible display including a first display area and a second display area extending from the first display area, the second display area being bendable or rollable;

a supporting structure supporting at least a portion of the flexible display; and a rib structure including a fixing portion coupled with a portion of the supporting structure and a stepped portion extending from the fixing portion and coupled to the first housing, wherein the supporting structure includes a plurality of bars, and wherein the plurality of bars are configured to transform in response to bending or rolling of the flexible display.

18. The electronic device of claim 17, further comprising:

an electrical component disposed in an area of the first housing or the second housing, wherein the supporting structure includes a first area overlapping the electrical component and a second area extending from the first area and having the rib structure disposed therein, wherein the first area of the supporting structure has a first thickness, and wherein the second area of the supporting structure has a second thickness greater than the first thickness.

19. The electronic device of claim 18, wherein the electrical component comprises at least one of a battery or a speaker module.

* * * * *